(12) United States Patent
Nagata et al.

(10) Patent No.: US 11,791,093 B2
(45) Date of Patent: Oct. 17, 2023

(54) RARE EARTH PERMANENT MAGNETS AND THEIR PREPARATION

(71) Applicant: SHIN-ETSU CHEMICAL CO., LTD., Tokyo (JP)

(72) Inventors: Hiroaki Nagata, Echizen (JP); Tadao Nomura, Echizen (JP); Takehisa Minowa, Echizen (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 121 days.

(21) Appl. No.: 16/801,828

(22) Filed: Feb. 26, 2020

(65) Prior Publication Data

US 2020/0194171 A1 Jun. 18, 2020

Related U.S. Application Data

(62) Division of application No. 15/454,433, filed on Mar. 9, 2017, now Pat. No. 10,614,952, which is a division of application No. 13/461,043, filed on May 1, 2012, now abandoned.

(30) Foreign Application Priority Data

May 2, 2011 (JP) ................................. 2011-102787
May 2, 2011 (JP) ................................. 2011-102789

(51) Int. Cl.
| | |
|---|---|
| H01F 1/057 | (2006.01) |
| H01F 41/02 | (2006.01) |
| B22F 3/24 | (2006.01) |
| C22C 38/00 | (2006.01) |
| C22C 38/06 | (2006.01) |
| C22C 38/10 | (2006.01) |
| C22C 38/16 | (2006.01) |
| C22C 33/02 | (2006.01) |
| B22F 1/17 | (2022.01) |
| B22F 3/12 | (2006.01) |
| B22F 9/04 | (2006.01) |
| B32B 15/01 | (2006.01) |
| C22C 19/07 | (2006.01) |
| H01F 1/055 | (2006.01) |

(52) U.S. Cl.
CPC ............ *H01F 41/0293* (2013.01); *B22F 1/17* (2022.01); *B22F 3/12* (2013.01); *B22F 3/24* (2013.01); *B22F 9/04* (2013.01); *B32B 15/01* (2013.01); *C22C 19/07* (2013.01); *C22C 33/0278* (2013.01); *C22C 38/002* (2013.01); *C22C 38/005* (2013.01); *C22C 38/06* (2013.01); *C22C 38/10* (2013.01); *C22C 38/16* (2013.01); *H01F 1/0557* (2013.01); *B22F 2003/248* (2013.01); *B22F 2009/041* (2013.01); *B22F 2009/042* (2013.01); *B22F 2009/044* (2013.01); *B22F 2301/155* (2013.01); *B22F 2301/355* (2013.01); *B22F 2998/10* (2013.01); *H01F 1/0577* (2013.01)

(58) Field of Classification Search
None
See application file for complete search history.

(56) References Cited

U.S. PATENT DOCUMENTS

| | | | |
|---|---|---|---|
| 4,496,395 | A | 1/1985 | Croat |
| 5,034,146 | A | 7/1991 | Ohashi et al. |
| 5,405,455 | A | 4/1995 | Kusunoki et al. |
| 7,048,808 | B2 | 5/2006 | Kaneko et al. |
| 7,402,226 | B2 | 7/2008 | Machida et al. |
| 7,824,506 | B2 | 11/2010 | Machida et al. |
| 7,985,303 | B2 | 7/2011 | Nagata et al. |
| 8,025,744 | B2 | 9/2011 | Nagata et al. |
| 8,252,123 | B2 | 8/2012 | Nagata et al. |
| 8,277,578 | B2 | 10/2012 | Nagata et al. |
| 8,557,057 | B2 | 10/2013 | Nagata et al. |
| 9,044,810 | B2 | 6/2015 | Nomura et al. |
| 2002/0038680 | A1 | 4/2002 | Arai et al. |

(Continued)

FOREIGN PATENT DOCUMENTS

| | | |
|---|---|---|
| CN | 1327889 A | 12/2001 |
| CN | 101707107 A | 5/2010 |

(Continued)

OTHER PUBLICATIONS

Durst, K. D., et al., "The Coercive Field of Sintered and Melt-Spun NdFeB Magnets", Journal of Magnetism and Magnetic materials, 1987, vol. 68, p. 63-75, cited in specification.

Machida, Kenichi et al., "Grain Boundary Modification and MAgnetic Properties of Nd—Fe—B Sintered Magnets", Abstracts of Spring Meeting of Japan Society of Powder and Powder Metallurgy, 2004, p. 202, cited in specification, w/ English translation.

Extended European Search Report dated Sep. 19, 2012, issued in corresponding European patent application No. 12166397.5.

Office Action dated May 12, 2015, issued in corresponding Japanese Patent Application No. 2012-094453 (2 pages).

Japanese Office Action dated Nov. 16, 2011, issued in corresponding Japanese Patent Application No. 2009-156644 with machine translation. (5 pages).

European Search Report dated Aug. 18, 2010, issued in corresponding European Patent Application No. 10251177.1. (6 pages).

(Continued)

*Primary Examiner* — Xiaowei Su

(74) *Attorney, Agent, or Firm* — WHDA, LLP

(57) ABSTRACT

A sintered magnet body ($R_a T^1_b M_c B_d$) coated with a powder mixture of an intermetallic compound ($R^1_i M^1_j$, $R^1_x T^2_y M^1_z$, $R^1_i M^1_j H_k$), alloy ($M^1_d M^2_e$) or metal ($M^1$) powder and a rare earth ($R^2$) oxide is diffusion treated. The $R^2$ oxide is partially reduced during the diffusion treatment, so a significant amount of $R^2$ can be introduced near interfaces of primary phase grains within the magnet through the passages in the form of grain boundaries. The coercive force is increased while minimizing a decline of remanence.

16 Claims, No Drawings

(56) References Cited

U.S. PATENT DOCUMENTS

| | | | |
|---|---|---|---|
| 2002/0053372 A1 | 5/2002 | Arai et al. | |
| 2002/0153064 A1 | 10/2002 | Arai et al. | |
| 2004/0050454 A1 | 3/2004 | Sekino et al. | |
| 2006/0231163 A1 | 10/2006 | Hirosawa et al. | |
| 2007/0034299 A1 | 2/2007 | Machida et al. | |
| 2007/0131309 A1 | 6/2007 | Shigemoto et al. | |
| 2007/0240789 A1* | 10/2007 | Nakamura | H01F 41/0293 148/101 |
| 2008/0006345 A1 | 1/2008 | Machida et al. | |
| 2008/0223489 A1* | 9/2008 | Nagata | H01F 41/0293 148/101 |
| 2008/0245442 A1* | 10/2008 | Nakamura | B22F 9/023 148/101 |
| 2008/0286595 A1 | 11/2008 | Yoshimura et al. | |
| 2009/0098006 A1 | 4/2009 | Nakamura et al. | |
| 2009/0127494 A1 | 5/2009 | Kanekiyo et al. | |
| 2009/0223606 A1 | 9/2009 | Kanekiyo et al. | |
| 2009/0226339 A1* | 9/2009 | Nakamura | C23C 10/30 419/9 |
| 2009/0252865 A1 | 10/2009 | Sagawa | |
| 2009/0297699 A1 | 12/2009 | Baba et al. | |
| 2010/0119703 A1* | 5/2010 | Sagawa | H01F 41/005 427/127 |
| 2010/0164663 A1 | 7/2010 | Nagata et al. | |
| 2011/0036457 A1 | 2/2011 | Nagata et al. | |
| 2011/0036458 A1 | 2/2011 | Nagata et al. | |
| 2011/0090032 A1 | 4/2011 | Nagata et al. | |
| 2011/0150691 A1 | 6/2011 | Nakamura et al. | |
| 2012/0280775 A1 | 11/2012 | Nagata et al. | |
| 2015/0093501 A1 | 4/2015 | Nomura et al. | |

FOREIGN PATENT DOCUMENTS

| | | |
|---|---|---|
| EP | 0 425 469 A2 | 5/1991 |
| EP | 1 845 539 A2 | 10/2007 |
| EP | 1 879 201 A1 | 1/2008 |
| EP | 1970924 A1 | 9/2008 |
| EP | 2071597 A1 | 6/2009 |
| EP | 2 144 257 A1 | 1/2010 |
| JP | 62-74048 A | 4/1987 |
| JP | 1-117303 A | 5/1989 |
| JP | 5-021218 A | 1/1993 |
| JP | 5-031807 A | 5/1993 |
| JP | 3143156 B2 | 3/2001 |
| JP | 2002-059246 A | 2/2002 |
| JP | 2002-190404 A | 7/2002 |
| JP | 2003-293008 A | 10/2003 |
| JP | 2004-296973 A | 10/2004 |
| JP | 2004-304038 A | 10/2004 |
| JP | 2005-011973 A | 1/2005 |
| JP | 387724 B2 | 3/2007 |
| JP | 2007-284738 A | 11/2007 |
| JP | 2007-287874 A | 11/2007 |
| JP | 2008-163179 A | 10/2008 |
| JP | 2008-235343 A | 10/2008 |
| JP | 2009-289994 A | 12/2009 |
| JP | 2010-98115 A | 4/2010 |
| JP | 4450239 B2 | 4/2010 |
| JP | 4482769 B2 | 6/2010 |
| JP | 4548673 B2 | 9/2010 |
| JP | 2010-238712 A | 10/2010 |
| JP | 4656323 B2 | 3/2011 |
| NO | 2006/064794 A1 | 6/2006 |
| NO | 2008/00332426 A1 | 3/2008 |
| NO | 2008/139690 A1 | 11/2008 |
| TW | 200905699 A | 2/2009 |
| WO | 2006-043348 A1 | 4/2006 |
| WO | 2006/064848 A1 | 6/2006 |
| WO | 2007/102391 A1 | 9/2007 |
| WO | 2008/023731 A1 | 2/2008 |

OTHER PUBLICATIONS

K. Machida et al, "High-Performance Rare Earth Magnet Having Specific Element Segregated at Grain Boundaries", Metal (Kinzoku), Aug. 2008, p. 760-765, vol. 78 No 8.

Taiwanese Office Action dated May 12, 2014, issued in Taiwanese Patent Application No. 099121499 which is counterpart to U.S. Appl. No. 14/462,134 (6 pages) w/ translation.

Machine translation of CN 101707107A, May 2010.

Park, K. T., et al., "Effect of Metal-Coating and Consecutive Heat Treatment on Coercivity of Thin Nd—Fe—B Sintered Magnets", Proceedings of the Sixteenth International Workshop on Rare-Earth Magnets and Their Applications, 2000, p. 257-264. cited in specification.

Ando et al. (Elements of Rapid Solidification, 1998).

Non-Final Office Action dated Oct. 31, 2017, issued in U.S. Appl. No. 14/462,134. (31 pages).

Final Office Action dated Apr. 25, 2018, issued in U.S. Appl. No. 14/462,134. (13 pages).

Notice of Allownace dated Sep. 21, 2018, issued in U.S. Appl. No. 14/462,134. (8pages).

Non-Final Office Action dated Nov. 2, 2021, issued in U.S. Appl. No. 16/801,674 (19 pages).

Non-Final Office Action dated Nov. 2, 2021, issued in U.S. Appl. No. 16/801,625 (21 pages).

Final Office Action dated Mar. 24, 2022, issued in U.S. Appl. No. 16/801,625 (8 pages).

Final Office Action dated Mar. 23, 2022, issued in U.S. Appl. No. 16/801,674 (10 pages).

Final Office Action dated Mar. 10, 2023, issued in U.S. Appl. No. 16/801,625. (8 pages).

Non-Final Office Action dated Oct. 14, 2022, issued in U.S. Appl. No. 16/801,625 (12 pages).

\* cited by examiner

RARE EARTH PERMANENT MAGNETS AND THEIR PREPARATION

CROSS-REFERENCE TO RELATED APPLICATION

This application is a Divisional of U.S. application Ser. No. 15/454,433, filed on Mar. 9, 2017, and wherein U.S. application Ser. No. 15/454,433 is a Divisional of U.S. patent application Ser. No. 13/461,043 filed on May 1, 2012, which is a non-provisional application which claims priority under 35 U.S.C. § 119(a) on Japanese Patent Application Nos. 2011-102787 and 2011-102789 filed in Japan on May 2, 2011 and May 2, 2011, respectively, the entire contents of which are hereby incorporated by reference.

TECHNICAL FIELD

This invention relates to an R—Fe—B permanent magnet having an enhanced coercive force with a minimal decline of remanence, and a method for preparing the same by coating a sintered magnet body with a mixture of an intermetallic compound, alloy or metal powder and a rare earth oxide and heat treating the coated body for diffusion.

BACKGROUND ART

By virtue of excellent magnetic properties, Nd—Fe—B permanent magnets find an ever increasing range of application. The recent challenge to the environmental problem has expanded the application range of these magnets from household electric appliances to industrial equipment, electric automobiles and wind power generators. It is required to further improve the performance of Nd—Fe—B magnets.

Indexes for the performance of magnets include remanence (or residual magnetic flux density) and coercive force. An increase in the remanence of Nd—Fe—B sintered magnets can be achieved by increasing the volume factor of $Nd_2Fe_{14}B$ compound and improving the crystal orientation. To this end, a number of modifications have been made. For increasing coercive force, there are known different approaches including grain refinement, the use of alloy compositions with greater Nd contents, and the addition of coercivity enhancing elements such as Al and Ga. The currently most common approach is to use alloy compositions having Dy or Tb substituted for part of Nd.

It is believed that the coercivity creating mechanism of Nd—Fe—B magnets is the nucleation type wherein nucleation of reverse magnetic domains at grain boundaries governs a coercive force. In general, a disorder of crystalline structure occurs at the grain boundary or interface. If a disorder of crystalline structure extends several nanometers in a depth direction near the interface of grains of $Nd_2Fe_{14}B$ compound which is the primary phase of the magnet, then it incurs a lowering of magnetocrystalline anisotropy and facilitates formation of reverse magnetic domains, reducing a coercive force (see Non-Patent Document 1). Substituting Dy or Tb for some Nd in the $Nd_2Fe_{14}B$ compound increases the anisotropic magnetic field of the compound phase so that the coercive force is increased. When Dy or Tb is added in an ordinary way, however, a loss of remanence is unavoidable because Dy or Tb substitution occurs not only near the interface of the primary phase, but even in the interior of the primary phase. Another problem arises in that amounts of expensive Tb and Dy must be used.

Besides, a number of attempts have been made for increasing the coercive force of Nd—Fe—B magnets. One exemplary attempt is a two-alloy method of preparing an Nd—Fe—B magnet by mixing two powdered alloys of different composition and sintering the mixture. Specifically, a powder of alloy A consisting of $R_2Fe_{14}B$ primary phase wherein R is mainly Nd and Pr, and a powder of alloy B containing various additive elements including Dy, Tb, Ho, Er, Al, Ti, V, and Mo, typically Dy and Tb are mixed together. This is followed by fine pulverization, molding in a magnetic field, sintering, and aging treatment whereby the Nd—Fe—B magnet is prepared. The sintered magnet thus obtained produces a high coercive force while minimizing a decline of remanence because Dy and Tb are absent at the center of $R_2Fe_{14}B$ compound primary phase grains and instead, the additive elements like Dy and Tb are localized near grain boundaries (see Patent Documents 1 and 2). In this method, however, Dy and Tb diffuse into the interior of primary phase grains during the sintering so that the layer where Dy and Tb are localized near grain boundaries has a thickness equal to or more than about 1 micrometer, which is substantially greater than the depth where nucleation of reverse magnetic domains occurs. The results are still not fully satisfactory.

Recently, there have been developed several processes of diffusing certain elements from the surface to the interior of a R—Fe—B sintered body for improving magnet properties. In one exemplary process, a rare earth metal such as Yb, Dy, Pr or Tb, or Al or Ta is deposited on the surface of Nd—Fe—B magnet using an evaporation or sputtering technique, followed by heat treatment, as described in Patent Documents 3 to 5 and Non-Patent Documents 2 and 3. Another exemplary process involves applying a powder of rare earth inorganic compound such as fluoride or oxide onto the surface of a sintered body and heat treatment as described in Patent Document 6. With these processes, the elements (e.g., Dy and Tb) disposed on the sintered body surface pass through grain boundaries in the sintered body structure and diffuse into the interior of the sintered body during the heat treatment. As a consequence, Dy and Tb can be enriched in a very high concentration at grain boundaries or near grain boundaries within sintered body primary phase grains. As compared with the two-alloy method described previously, these processes produce an ideal morphology. Since the magnet properties reflect the morphology, a minimized decline of remanence and an increase of coercive force are accomplished. However, the processes utilizing evaporation or sputtering have many problems associated with units and steps when practiced on a mass scale and suffer from poor productivity.

Besides the foregoing methods, Patent Document 6 discloses a method comprising coating a surface of a sintered body with a powdered rare earth inorganic compound such as fluoride or oxide and heat treatment, and Patent Document 8 discloses a method comprising mixing an Al, Cu or Zn powder with a fluoride, coating a magnet with the mixture, and heat treatment. These methods are characterized by a very simple coating step and a high productivity. Specifically, since the coating step is carried out by dispersing a non-metallic inorganic compound powder in water, immersing a magnet in the dispersion and drying, the step is simple as compared with sputtering and evaporation. Even when a heat treatment furnace is packed with a large number of magnet pieces, the magnet pieces are not fused together during heat treatment. This leads to a high productivity. However, since Dy or Tb diffuses through substitution reaction between the powder and the magnet component, it is difficult to introduce a substantial amount of Dy or Tb into the magnet.

Further Patent Document 7 discloses coating of a magnet body with a mixture of an oxide or fluoride of Dy or Tb and calcium or calcium hydride powder, followed by heat treatment. During the heat treatment, once Dy or Tb is reduced utilizing calcium reducing reaction, Dy or Tb is diffused. The method is advantageous for introducing a substantial amount of Dy or Tb into the magnet, but less productive because the calcium or calcium hydride powder needs careful handling.

Patent Documents 9 to 13 disclose coating of the sintered body surface with a metal alloy instead of a rare earth inorganic compound powder such as fluoride or oxide, followed by heat treatment. The method of coating with only metal alloy has the drawback that it is difficult to coat the metal alloy onto the magnet surface in a large and uniform coating weight. In Patent Documents 14 and 15, a metal powder containing Dy and/or Tb is diffused into the mother alloy. The oxygen concentration of the mother alloy is restricted below 0.5% by weight, and the rare earth-containing metal powder is closely contacted with the mother alloy by a barrel painting technique of oscillating impact media within a barrel for agitation. Diffusion takes place under these conditions. However, this method requires many steps as compared with the method of coating a mother alloy magnet with a dispersion of a powder mixture of an intermetallic compound and a rare earth oxide in a solvent. The method is time consuming and is not industrially useful.

CITATION LIST

Patent Document 1: JP 1820677
Patent Document 2: JP 3143156
Patent Document 3: JP-A 2004-296973
Patent Document 4: JP 3897724
Patent Document 5: JP-A 2005-11973
Patent Document 6: JP 4450239
Patent Document 7: JP 4548673
Patent Document 8: JP-A 2007-287874
Patent Document 9: JP 4656323
Patent Document 10: JP 4482769
Patent Document 11: JP-A 2008-263179
Patent Document 12: JP-A 2009-289994
Patent Document 13: JP-A 2010-238712
Patent Document 14: WO 2008/032426
Patent Document 15: WO 2008/139690
Non-Patent Document 1: K. D. Durst and H. Kronmuller, "THE COERCIVE FIELD OF SINTERED AND MELT-SPUN NdFeB MAGNETS," Journal of Magnetism and Magnetic Materials, 68 (1987), 63-75
Non-Patent Document 2: K.T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000)
Non-Patent Document 3: K. Machida, et al., "Grain Boundary Modification of Nd—Fe—B Sintered Magnet and Magnetic Properties," Proceedings of 2004 Spring Meeting of the Powder & Powder Metallurgy Society, p. 202

SUMMARY OF INVENTION

An object of the invention is to provide an R—Fe—B sintered magnet which is prepared by coating a sintered magnet body with a powder mixture of an intermetallic compound, alloy or metal powder and a rare earth oxide and effecting diffusion treatment and which magnet features efficient productivity, excellent magnetic performance, a minimal amount of Tb or Dy used, an increased coercive force, and a minimized decline of remanence. Another object is to provide a method for preparing the same.

Regarding the surface coating of an R—Fe—B sintered body with a rare earth oxide which is the best from the aspect of productivity, the inventors attempted to increase the diffusion amount. The inventors have discovered that when a mixture of an oxide containing a rare earth element such as Dy or Tb and an intermetallic compound or metal powder is used for coating, a significant amount of Dy or Tb can be introduced near interfaces of primary phase grains within the magnet through the passages in the form of grain boundaries, as compared with the method of effecting heat treatment after coating with a rare earth inorganic compound powder such as fluoride or oxide, because the oxide is partially reduced during heat treatment. As a consequence, the coercive force of the magnet is increased while minimizing a decline of remanence. Additionally, the process is improved in productivity over the prior art processes. The invention is predicated on this discovery.

The invention provides rare earth permanent magnets and methods for preparing the same, as defined below.

[1] A method for preparing a rare earth permanent magnet, comprising the steps of:

disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \le a \le 20$, $0 \le c \le 10$, $4.0 \le d \le 7.0$, the balance of b, and a+b+c+d=100, the powder mixture comprising an alloy powder having the composition $R^1_i M^1_j$ wherein $R^1$ is at least one element selected from rare earth elements inclusive of Y and Sc, $M^1$ is at least one element selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi, "i" and "j" indicative of atomic percent are in the range: $15 < j \le 99$, the balance of i, and i+j=100, containing at least 70% by volume of an intermetallic compound phase, and having an average particle size of up to 500 μm, and at least 10% by weight of an $R^2$ oxide wherein $R^2$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, for causing the elements $R^1$, $R^2$ and $M^1$ in the powder mixture to diffuse to grain boundaries in the interior of the sintered magnet body and/or near grain boundaries within the sintered magnet body primary phase grains.

[2] A method for preparing a rare earth permanent magnet, comprising the steps of:

disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \le a \le 20$, $0 \le c \le 10$, $4.0 \le d \le 7.0$, the balance of b, and a+b+c+d=100, the powder mixture comprising an alloy powder having the composition $R^1_i M^1_j H_k$ wherein $R^1$ is at least one element selected from rare earth elements inclusive of Y and Sc, $M^1$ is at least one element selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi, H is hydrogen, "i," "j" and "k" indicative of atomic percent are in the range: $15<j≤99$, $0<k≤(i×2.5)$, the balance of i, and $i+j+k=100$, containing at least 70% by volume of an intermetallic compound phase, and having an average particle size of up to 500 μm, and at least 10% by weight of an $R^2$ oxide wherein $R^2$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, for causing the elements $R^1$, $R^2$, and $M^1$ in the powder mixture to diffuse to grain boundaries in the interior of the sintered magnet body and/or near grain boundaries within the sintered magnet body primary phase grains.

[3] The method of [1] or [2] wherein the heat treating step includes heat treatment at a temperature from 200° C. to (Ts−10)° C. for 1 minute to 30 hours wherein Ts represents the sintering temperature of the sintered magnet body.

[4] The method of any one of [1] to [3] wherein the disposing step includes dispersing the powder mixture in an organic solvent or water, immersing the sintered magnet body in the resulting slurry, taking up the sintered magnet body, and drying for thereby covering the surface of the sintered magnet body with the powder mixture.

[5] A method for preparing a rare earth permanent magnet, comprising the steps of:

disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12≤a≤20$, $0≤c≤10$, $4.0≤d≤7.0$, the balance of b, and $a+b+c+d=100$, the powder mixture comprising an alloy powder having the composition $R^1_x T^2_y M^1_z$ wherein $R^1$ is at least one element selected from rare earth elements inclusive of Y and Sc, $T^2$ is one or both of Fe and Co, $M^1$ is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, x, y and z indicative of atomic percent are in the range: $5≤x≤85$, $15<z≤95$, $x+z<100$, the balance of y, $y>0$, and $x+y+z=100$, containing at least 70% by volume of an intermetallic compound phase, and having an average particle size of up to 500 μm, and at least 10% by weight of an $R^2$ oxide wherein $R^2$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, for causing the elements $R^1$, $R^2$, $M^1$ and $T^2$ in the powder mixture to diffuse to grain boundaries in the interior of the sintered magnet body and/or near grain boundaries within the sintered magnet body primary phase grains.

[6] The method of [5] wherein the heat treating step includes heat treatment at a temperature from 200° C. to (Ts−10)° C. for 1 minute to 30 hours wherein Ts represents the sintering temperature of the sintered magnet body.

[7] The method of [5] or [6] wherein the disposing step includes dispersing the powder mixture in an organic solvent or water, immersing the sintered magnet body in the resulting slurry, taking up the sintered magnet body, and drying for thereby covering the surface of the sintered magnet body with the powder mixture.

[8] The method of any one of [1] to [7] wherein the sintered magnet body has a shape including a minimum portion with a dimension equal to or less than 20 mm.

[9] A rare earth permanent magnet, which is prepared by disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12≤a≤20$, $0≤c≤10$, $4.0≤d≤7.0$, the balance of b, and $a+b+c+d=100$, the powder mixture comprising an alloy powder having the composition $R^1_i M^1_j$ wherein $R^1$ is at least one element selected from rare earth elements inclusive of Y and Sc, $M^1$ is at least one element selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi, "i" and "j" indicative of atomic percent are in the range: $15<j≤99$, the balance of i, and $i+j=100$, containing at least 70% by volume of an intermetallic compound phase, and having an average particle size of up to 500 μm, and at least 10% by weight of an $R^2$ oxide wherein $R^2$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, wherein the elements $R^1$, $R^2$ and $M^1$ in the powder mixture are diffused to grain boundaries in the interior of the sintered magnet body and/or near grain boundaries within the sintered magnet body primary phase grains so that the coercive force of the rare earth permanent magnet is increased over the original sintered magnet body.

[10] A rare earth permanent magnet, which is prepared by disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12≤a≤20$, $0≤c≤10$, $4.0≤d≤7.0$, the balance of b, and $a+b+c+d=100$, the powder mixture comprising an alloy powder having the composition $R^1_i M^1_j H_k$ wherein $R^1$ is at least one element selected from rare earth elements inclusive of Y and Sc, $M^1$ is at least one element selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi, H is hydrogen, "i," "j" and "k" indicative of atomic percent are in the range: $15<j≤99$, $0<k≤(i×2.5)$, the balance of i, and $i+j+k=100$, containing at least 70% by volume of an intermetallic compound phase, and having an average particle size of up to 500 μm, and at least 10% by weight of an $R^2$ oxide wherein $R^2$ is at least one element selected from rare earth elements inclusive of Y and Sc, having an average particle size of up to 100 µm, and heat treating the sintered magnet body having the powder mixture disposed on its surface at a temperature lower than or equal to the sintering temperature of the sintered magnet body in vacuum or in an inert gas, wherein the elements $R^1$, $R^2$ and $M^1$ in the powder mixture are diffused to grain boundaries in the interior of the sintered magnet body and/or near grain boundaries within the sintered magnet body primary phase grains so that the coercive force of the rare earth permanent magnet is increased over the original sintered magnet body.

[11] A rare earth permanent magnet, which is prepared by disposing a powder mixture on a surface of a sintered magnet body having the composition $R_a T^1{}_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \le a \le 20$, $0 \le c \le 10$, $4.0 \le d \le 7.0$, the balance of b, and $a+b+c+d=100$, the powder mixture comprising an alloy powder having the composition $R^1{}_x T^2{}_y M^1{}_z$ wherein $R^1$ is at least one element selected from rare earth elements inclusive of Y and Sc, $T^2$ is one or both of Fe and Co, $M^1$ is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, x, y and z indicative of atomic percent are in the range: $5 \le x \le 85$, $15 < z \le 95$, $x+z<100$, the balance of y, $y>0$, and $x+y+z=100$, containing at least 70% by volume of an intermetallic compound phase, and having an average particle size of up to 500 µm, and at least 10% by weight of an $R^2$ oxide wherein $R^2$ is at least one element selected from rare earth elements inclusive of Y and Sc, having an average particle size of up to 100 µm, and heat treating the sintered magnet body having the powder mixture disposed on its surface at a temperature lower than or equal to the sintering temperature of the sintered magnet body in vacuum or in an inert gas, wherein the elements $R^1$, $R^2$, $M^1$ and $T^2$ in the powder mixture are diffused to grain boundaries in the interior of the sintered magnet body and/or near grain boundaries within the sintered magnet body primary phase grains so that the coercive force of the rare earth permanent magnet is increased over the original sintered magnet body.

[12] A method for preparing a rare earth permanent magnet, comprising the steps of:

disposing a powder mixture on a surface of a sintered magnet body having the composition $R_a T^1{}_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \le a \le 20$, $0 \le c \le 10$, $4.0 \le d \le 7.0$, the balance of b, and $a+b+c+d=100$, the powder mixture comprising an alloy powder having the composition $M^1{}_d M^2{}_e$ wherein $M^1$ and $M^2$ each are at least one element selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi, $M^1$ and $M^2$ are different, "d" and "e" indicative of atomic percent are in the range: $0.1 \le e \le 99.9$, the balance of d, and $d+e=100$, containing at least 70% by volume of an intermetallic compound phase, and having an average particle size of up to 500 µm, and at least 10% by weight of an $R^2$ oxide wherein $R^2$ is at least one element selected from rare earth elements inclusive of Y and Sc, having an average particle size of up to 100 µm, and heat treating the sintered magnet body having the powder mixture disposed on its surface at a temperature lower than or equal to the sintering temperature of the sintered magnet body in vacuum or in an inert gas, for causing the elements $R^2$, $M^1$ and $M^2$ in the powder mixture to diffuse to grain boundaries in the interior of the sintered magnet body and/or near grain boundaries within the sintered magnet body primary phase grains.

[13] A method for preparing a rare earth permanent magnet, comprising the steps of:

disposing a powder mixture on a surface of a sintered magnet body having the composition $R_a T^1{}_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \le a \le 20$, $0 \le c \le 10$, $4.0 \le d \le 7.0$, the balance of b, and $a+b+c+d=100$, the powder mixture comprising an $M^1$ powder wherein $M^1$ is at least one element selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi, having an average particle size of up to 500 µm, and at least 10% by weight of an $R^2$ oxide wherein $R^2$ is at least one element selected from rare earth elements inclusive of Y and Sc, having an average particle size of up to 100 µm, and heat treating the sintered magnet body having the powder mixture disposed on its surface at a temperature lower than or equal to the sintering temperature of the sintered magnet body in vacuum or in an inert gas, for causing the elements $R^2$ and $M^1$ in the powder mixture to diffuse to grain boundaries in the interior of the sintered magnet body and/or near grain boundaries within the sintered magnet body primary phase grains.

[14] The method of [12] or [13] wherein the heat treating step includes heat treatment at a temperature from 200° C. to (Ts−10)° C. for 1 minute to 30 hours wherein Ts represents the sintering temperature of the sintered magnet body.

[15] The method of any one of [12] to [14] wherein the disposing step includes dispersing the powder mixture in an organic solvent or water, immersing the sintered magnet body in the resulting slurry, taking up the sintered magnet body, and drying for thereby covering the surface of the sintered magnet body with the powder mixture.

[16] The method of any one of [12] to [15] wherein the sintered magnet body has a shape including a minimum portion with a dimension equal to or less than 20 mm.

[17] A rare earth permanent magnet, which is prepared by disposing a powder mixture on a surface of a sintered magnet body having the composition $R_a T^1{}_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \le a \le 20$, $0 \le c \le 10$, $4.0 \le d \le 7.0$, the balance of b, and $a+b+c+d=100$, the powder mixture comprising an alloy powder having the composition $M^1{}_d M^2{}_e$ wherein $M^1$ and $M^2$ each are at least one element selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi, $M^1$ and $M^2$ are different, "d" and "e" indicative of atomic percent are in the range: $0.1 \leq e \leq 99.9$, the balance of d, and d+e=100, containing at least 70% by volume of an intermetallic compound phase, and having an average particle size of up to 500 μm, and at least 10% by weight of an $R^2$ oxide wherein $R^2$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, wherein the elements $R^2$, $M^1$ and $M^2$ in the powder mixture are diffused to grain boundaries in the interior of the sintered magnet body and/or near grain boundaries within the sintered magnet body primary phase grains so that the coercive force of the rare earth permanent magnet is increased over the original sintered magnet body.

[18] A rare earth permanent magnet, which is prepared by disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \leq a \leq 20$, $0 \leq c \leq 10$, $4.0 \leq d \leq 7.0$, the balance of b, and a+b+c+d=100, the powder mixture comprising an $M^1$ powder wherein $M^1$ is at least one element selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi, having an average particle size of up to 500 μm, and at least 10% by weight of an $R^2$ oxide wherein $R^2$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, wherein the elements $R^2$ and $M^1$ in the powder mixture are diffused to grain boundaries in the interior of the sintered magnet body and/or near grain boundaries within the sintered magnet body primary phase grains so that the coercive force of the rare earth permanent magnet is increased over the original sintered magnet body.

ADVANTAGEOUS EFFECTS OF INVENTION

When a mixture of an oxide containing a rare earth element such as Dy or Tb and an intermetallic compound or metal powder is used for coating, the oxide is partially reduced during subsequent heat treatment. Thus a significant amount of the rare earth element such as Dy or Tb can be introduced near interfaces of primary phase grains within the magnet through the passages in the form of grain boundaries, as compared with the method of effecting heat treatment after coating with a rare earth inorganic compound powder such as fluoride or oxide. As a consequence, the coercive force of the magnet is increased while minimizing a decline of remanence. Additionally, the process is improved in productivity over the prior art processes. The R—Fe—B sintered magnet exhibits excellent magnetic performance, an increased coercive force, and a minimal decline of remanence, despite a minimal amount of Tb or Dy used.

DESCRIPTION OF EMBODIMENTS

Briefly stated, an R—Fe—B sintered magnet is prepared according to the invention by applying a powder mixture of an intermetallic compound-based alloy powder and a rare earth oxide or metal powder onto a sintered magnet body and effecting diffusion treatment. The resultant magnet has advantages including excellent magnetic performance and a minimal amount of Tb or Dy used.

The mother material used herein is a sintered magnet body having the composition $R_a T^1_b M_c B_d$, which is sometimes referred to as "mother sintered body." Herein R is one or more elements selected from rare earth elements inclusive of yttrium (Y) and scandium (Sc), specifically from among Sc, Y, La, Ce, Pr, Nd, Sm, Eu, Gd, Tb, Dy, Ho, Er, Yb, and Lu. The rare earth elements inclusive of Sc and Y account for 12 to 20 atomic percent (at %), and preferably 13 to 18 at % of the sintered magnet body, differently stated, $12 \leq a \leq 20$, preferably $13 \leq a \leq 18$. Preferably the majority of R is Nd and/or Pr. Specifically Nd and/or Pr accounts for 50 to 100 at %, more preferably 70 to 100 at % of the rare earth elements. $T^1$ is one or both of iron (Fe) and cobalt (Co). M is one or more elements selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi and accounts for 0 to 10 at %, and preferably 0 to 5 at % of the sintered magnet body, differently stated, $0 \leq c \leq 10$, preferably $0 \leq c \leq 5$. B is boron and accounts for 4 to 7 at % of the sintered magnet body ($4 \leq d \leq 7$). Particularly when B is 5 to 6 at % ($5 \leq d \leq 6$), a significant improvement in coercive force is achieved by diffusion treatment. The balance consists of $T^1$. Preferably $T^1$ accounts for 60 to 84 at %, more preferably 70 to 82 at % of the sintered magnet body, differently stated, $60 \leq b \leq 84$, preferably $70 \leq b \leq 82$. The subscripts "a," "b," "c" and "d" indicative of atomic percent meet a+b+c+d=100.

The alloy for the mother sintered magnet body is prepared by melting metal or alloy feeds in vacuum or an inert gas atmosphere, preferably argon atmosphere, and casting the melt into a flat mold or book mold or strip casting. A possible alternative is a so-called two-alloy process involving separately preparing an alloy approximate to the $R_2Fe_{14}B$ compound composition constituting the primary phase of the relevant alloy and a rare earth-rich alloy serving as a liquid phase aid at the sintering temperature, crushing, then weighing and mixing them. Notably, the alloy approximate to the primary phase composition is subjected to homogenizing treatment, if necessary, for the purpose of increasing the amount of the $R_2Fe_{14}B$ compound phase, since primary crystal α-Fe is likely to be left depending on the cooling rate during casting and the alloy composition. The homogenizing treatment is a heat treatment at 700 to 1,200° C. for at least one hour in vacuum or in an Ar atmosphere. Alternatively, the alloy approximate to the primary phase composition may be prepared by the strip casting technique. To the rare earth-rich alloy serving as a liquid phase aid, the melt quenching and strip casting techniques are applicable as well as the above-described casting technique.

The alloy is generally crushed or coarsely ground to a size of 0.05 to 3 mm, especially 0.05 to 1.5 mm. The crushing step uses a Brown mill or hydrogen decrepitation, with the hydrogen decrepitation being preferred for those alloys as strip cast. The coarse powder is then finely divided to an average particle size of 0.2 to 30 μm, especially 0.5 to 20 μm, for example, on a jet mill using high-pressure nitrogen.

The fine powder is compacted on a compression molding machine under a magnetic field. The green compact is then placed in a sintering furnace where it is sintered in vacuum or in an inert gas atmosphere usually at a temperature of 900 to 1,250° C., preferably 1,000 to 1,100° C. The sintered block thus obtained contains 60 to 99% by volume, preferably 80 to 98% by volume of the tetragonal $R_2Fe_{14}B$ compound as the primary phase, with the balance being 0.5 to 20% by volume of a rare earth-rich phase and 0.1 to 10% by volume of at least one compound selected from among rare earth oxides, and carbides, nitrides and hydroxides of incidental impurities, and mixtures or composites thereof.

The resulting sintered magnet block may be machined or worked into a predetermined shape. In the invention, the elements (including $R^1$, $R^2$, $M^1$, $M^2$ and $T^2$) which are to be diffused into the sintered magnet body interior are supplied from the sintered magnet body surface. Thus, if a minimum portion of the sintered magnet body has too large a dimension, the objects of the invention are not achievable. For this reason, the shape includes a minimum portion having a dimension equal to or less than 20 mm, and preferably equal to or less than 10 mm, with the lower limit being equal to or more than 0.1 mm. The sintered body includes a maximum portion whose dimension is not particularly limited, with the maximum portion dimension being desirably equal to or less than 200 mm.

According to the invention, a diffusion powder selected from the following powder mixtures (i) to (iv) is disposed on the sintered magnet body before diffusion treatment is carried out.

(i) a powder mixture of an alloy of the composition $R^1_i M^1_j$ containing at least 70% by volume of a rare earth intermetallic compound phase and an $R^2$ oxide (ii) a powder mixture of an alloy of the composition $R^1_i M^1_j H_k$ containing at least 70% by volume of a rare earth intermetallic compound phase and an $R^2$ oxide (iii) a powder mixture of an alloy of the composition $R^1_x T^2_y M^1_z$ containing at least 70% by volume of a rare earth intermetallic compound phase and an $R^2$ oxide (iv) a powder mixture of an alloy of the composition $M^1_d M^2_e$ containing at least 70% by volume of an intermetallic compound phase and an $R^2$ oxide (v) a powder mixture of a metal $M^1$ and an $R^2$ oxide The alloy which is often referred to as "diffusion alloy" is in powder form having an average particle size of less than or equal to 500 μm. The $R^2$ oxide wherein $R^2$ is one or more elements selected from rare earth elements inclusive of Y and Sc is in powder form having an average particle size of less than or equal to 100 μm. The powder mixture consists of the diffusion alloy and at least 10% by weight of the $R^2$ oxide. The powder mixture is disposed on the surface of the sintered magnet body. The sintered magnet body having the powder mixture disposed on its surface is heat treated at a temperature lower than or equal to the sintering temperature of the sintered magnet body in vacuum or in an inert gas, whereby the oxide in admixture with the (rare earth) intermetallic compound is partially reduced. During the heat treatment, the elements $R^1$, $R^2$, $M^1$, $M^2$ and $T^2$ in the powder mixture (selected depending on a particular diffusion powder used) can be diffused to grain boundaries in the interior of the sintered magnet body and/or near grain boundaries within the sintered magnet body primary phase grains, in a more amount than achievable by the prior art methods.

Herein $R^1$ is one or more elements selected from rare earth elements inclusive of Y and Sc. Preferably the majority of $R^1$ is Nd and/or Pr. Specifically Nd and/or Pr accounts for 1 to 100 at %, more preferably 20 to 100 at % of $R^1$. $M^1$ is one or more elements selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi. $T^2$ is Fe and/or Co.

In the alloy $R^1_i M^1_j$, $M^1$ accounts for 15 to 99 at %, preferably 20 to 90 at %, differently stated, j=15 to 99, preferably j=20 to 90, with the balance of $R^1$ (meaning i+j=100).

In the alloy $R^1_i M^1_j H_k$, $M^1$ accounts for 15 to 99 at %, preferably 20 to 90 at %, differently stated, j=15 to 99, preferably j=20 to 90. Hydrogen (H) is present in an amount of 0<k≤(i×2.5) at %, preferably at least 0.1 at % (k≥0.1). The balance consists of $R^1$ (meaning i+j+k=100), and $R^1$ is preferably present in an amount of 20 to 90 at %, namely i=20 to 90.

In the alloy $R^1_x T^2_y M^1_z$, $M^1$ accounts for 15 to 95 at %, preferably 20 to 90 at %, differently stated, z=15 to 90, preferably z=20 to 90. $R^1$ accounts for 5 to 85 at %, preferably 10 to 80 at %, differently stated, x=5 to 85, preferably x=10 to 80. The sum of $M^1$ and $R^1$ is less than 100 at % (x+z<100), preferably 25 to 99.5 at % (x+y=25 to 99.5). The balance consists of $T^2$ which is Fe and/or Co (meaning x+y+z=100), and y>0. Typically $T^2$ accounts for 0.5 to 75 at %, preferably 1 to 60 at %, differently stated, y=0.5 to 75, preferably y=1 to 60.

In the alloy $M^1_d M^2_e$, $M^1$ and $M^2$ are different from each other and each is one or more elements selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi. The subscripts d and e indicative of atomic percent are in the range: 0.1≤e≤99.9, preferably 10≤e≤90, and more preferably 20≤e≤80, with the balance of d.

In the $M^1$ metal powder, $M^1$ is one or more elements selected from the group consisting of Al, Si, C, P, Ti, V, Cr, Mn, Ni, Fe, Co, Cu, Zn, Ga, Ge, Zr, Nb, Mo, Ag, In, Sn, Sb, Hf, Ta, W, Pb, and Bi.

The diffusion alloy may contain incidental impurities such as nitrogen (N) and oxygen (O), with an acceptable total amount of such impurities being equal to or less than 4 at %, preferably equal to or less than 2 at %, and more preferably equal to or less than 1 at %.

The diffusion alloy containing at least 70% by volume of the intermetallic compound phase may be prepared, like the alloy for the mother sintered magnet body, by melting metal or alloy feeds in vacuum or an inert gas atmosphere, preferably argon atmosphere, and casting the melt into a flat mold or book mold. A high-frequency melting method and a strip casting method may also be employed. The alloy is then crushed or coarsely ground to a size of about 0.05 to 3 mm, especially about 0.05 to 1.5 mm by means of a Brown mill or hydrogen decrepitation. The coarse powder is then finely divided, for example, by a ball mill, vibration mill or jet mill using high-pressure nitrogen. The smaller the powder particle size, the higher becomes the diffusion efficiency. The diffusion alloy containing the intermetallic compound phase, when powdered, preferably has an average particle size equal to or less than 500 μm, more preferably equal to or less than 300 μm, and even more preferably equal to or less than 100 μm. However, if the particle size is too small, then the influence of surface oxidation becomes noticeable, and handling is dangerous. Thus the lower limit of average particle size is preferably equal to or more than 1 μm. As used herein, the "average particle size" may be determined as a weight average diameter $D_{50}$ (particle diameter at 50% by weight cumulative, or median diameter) using, for example, a particle size distribution measuring instrument relying on laser diffractometry or the like.

The $M^1$ metal powder may be prepared by crushing or coarsely grinding a metal mass to a size of 0.05 to 3 mm, especially 0.05 to 1.5 mm on a suitable grinding machine such as a jaw crusher or Brown mill. The coarse powder is then finely divided, for example, by a ball mill, vibration mill or jet mill using high-pressure nitrogen. Alternatively, fine division may be achieved by an atomizing method of ejecting a metal melt through small nozzles under high-pressure gas as mist. The $M^1$ metal powder has an average particle size equal to or less than 500 μm, more preferably equal to or less than 300 μm, and even more preferably equal to or less than 100 μm. However, if the particle size is too small, then the influence of surface oxidation becomes noticeable, and handling is dangerous. Thus the lower limit of average particle size is preferably equal to or more than 1 μm.

The other component of the powder mixture is an $R^2$ oxide which may be any of oxides of rare earth elements inclusive of Y and Sc, preferably oxides containing Dy or Tb. The $R^2$ oxide powder has an average particle size equal to or less than 100 μm, more preferably equal to or less than 50 μm, and even more preferably equal to or less than 20 μm. The $R^2$ oxide is present in an amount of at least 10% by weight, preferably at least 20% by weight, and more preferably at least 30% by weight of the powder mixture. Less than 10% by weight of the $R^2$ oxide is too small for the rare earth oxide to exert its mixing effect. The upper limit of the amount of the $R^2$ oxide is up to 99% by weight, especially up to 90% by weight.

After the powder mixture of the diffusion alloy powder or $M^1$ metal powder and the $R^2$ oxide powder is disposed on the surface of the mother sintered magnet body, the mother sintered magnet body coated with the powder mixture is heat treated in vacuum or in an atmosphere of an inert gas such as argon (Ar) or helium (He) at a temperature equal to or below the sintering temperature (designated Ts in ° C.) of the sintered magnet body. This heat treatment is referred to as "diffusion treatment." The diffusion treatment causes the rare earth oxide in admixture with the intermetallic compound to be partially reduced, whereby elements $R^1$, $R^2$, $M^1$, $M^2$ and $T^2$ in the powder mixture are diffused to grain boundaries in the interior of the sintered magnet body and/or near grain boundaries within sintered magnet body primary phase grains in more amounts than achievable in the prior art.

The powder mixture of the diffusion alloy powder or $M^1$ metal powder and the $R^2$ oxide powder is disposed on the surface of the mother sintered magnet body, for example, by dispersing the powder mixture in water or an organic solvent to form a slurry, immersing the magnet body in the slurry, taking up the magnet body, and drying the magnet body by hot air drying or in vacuum or in air. Spray coating is also possible. The slurry may contain 1 to 90% by weight, and preferably 5 to 70% by weight of the powder mixture.

The conditions of diffusion treatment vary with the type and composition of the powder mixture (including the type and composition of two components) and are preferably selected such that elements $R^1$, $R^2$, $M^1$, $M^2$ and $T^2$ in the diffusion powder are enriched at grain boundaries in the interior of the sintered magnet body and/or near grain boundaries within sintered magnet body primary phase grains. The temperature of diffusion treatment is equal to or below the sintering temperature (designated Ts in ° C.) of the sintered magnet body. If diffusion treatment is effected above Ts, there arise problems that (1) the structure of the sintered magnet body can be altered to degrade magnetic properties, and (2) the machined dimensions cannot be maintained due to thermal deformation. For this reason, the temperature of diffusion treatment is equal to or below Ts° C. of the sintered magnet body, and preferably equal to or below (Ts−10)° C. The lower limit of temperature may be selected as appropriate though the temperature is typically at least 200° C., preferably at least 350° C., and more preferably at least 600° C. The time of diffusion treatment is typically from 1 minute to 30 hours. Within less than 1 minute, the diffusion treatment is not complete. If the treatment time exceeds 30 hours, the structure of the sintered magnet body can be altered, oxidation or evaporation of components inevitably occurs to degrade magnetic properties, or $R^1$, $R^2$, $M^1$, $M^2$ and $T^2$ are not only enriched near grain boundaries in the interior of the sintered body and/or grain boundaries within sintered body primary phase grains, but also diffused into the interior of primary phase grains. The preferred time of diffusion treatment is from 1 minute to 10 hours, and more preferably from 10 minutes to 6 hours.

Through appropriate diffusion treatment, the constituent elements $R^1$, $R^2$, $M^1$, $M^2$ and $T^2$ in the powder mixture disposed on the surface of the sintered magnet body are diffused into the sintered magnet body while traveling mainly along grain boundaries in the sintered magnet body structure. This results in the structure in which $R^1$, $R^2$, $M^1$, $M^2$ and $T^2$ are enriched near grain boundaries in the interior of the sintered magnet body and/or grain boundaries within sintered magnet body primary phase grains.

The permanent magnet thus obtained is improved in coercivity because the diffusion of $R^1$, $R^2$, $M^1$, $M^2$ and $T^2$ modifies the morphology near the primary phase grain boundaries within the structure so as to suppress a decline of magnetocrystalline anisotropy at primary phase grain boundaries or to create a new phase at grain boundaries. Since the elements in the powder mixture have not diffused into the interior of primary phase grains, a decline of remanence is restrained. The magnet is a high performance permanent magnet.

After the diffusion treatment, the magnet may be further subjected to aging treatment at a temperature of 200 to 900° C. for augmenting the coercivity enhancement.

EXAMPLE

Examples are given below for further illustrating the invention although the invention is not limited thereto.

Example 1 and Comparative Examples 1 and 2

An alloy was prepared by weighing amounts of Nd, Co, Al and Fe metals having a purity of at least 99% by weight and ferroboron, high-frequency heating in an argon atmosphere for melting, and casting the alloy melt on a single roll of copper in an argon atmosphere, that is, strip casting into a strip of alloy. The alloy consisted of 12.8 at % of Nd, 1.0 at % of Co, 0.5 at % of Al, 6.0 at % of B, and the balance of Fe. This is designated alloy A. Alloy A was then subjected to hydrogen decrepitation by causing the alloy to absorb hydrogen, vacuum evacuating and heating up to 500° C. for desorbing part of hydrogen. In this way, alloy A was pulverized into a coarse powder under 30 mesh.

Another alloy was prepared by weighing amounts of Nd, Dy, Fe, Co, Al and Cu metals having a purity of at least 99% by weight and ferroboron, high-frequency heating in an argon atmosphere for melting, and casting the alloy melt. The alloy consisted of 23 at % of Nd, 12 at % of Dy, 25 at % of Fe, 6 at % of B, 0.5 at % of Al, 2 at % of Cu, and the balance of Co. This is designated alloy B. Alloy B was ground on a Brown mill in a nitrogen atmosphere into a coarse powder under 30 mesh.

Next, 94 wt % of alloy A powder and 6 wt % of alloy B powder were mixed in a nitrogen-purged V-blender for 30 minutes. The powder mixture was finely pulverized on a jet mill using high-pressure nitrogen gas into a fine powder having a mass median particle diameter of 4.1 μm. The fine powder was compacted in a nitrogen atmosphere under a pressure of about 1 ton/cm² while being oriented in a magnetic field of 15 kOe. The green compact was then placed in a sintering furnace where it was sintered in an argon atmosphere at 1,060° C. for 2 hours, obtaining a magnet block of 10 mm×20 mm×15 mm (thick). Using a diamond grinding tool, the magnet block was machined on all the surfaces into a shape having dimensions of 4 mm×4 mm×2 mm (magnetic anisotropy direction). The machined magnet body was washed in sequence with alkaline solution, deionized water, acid solution, and deionized water, and dried, obtaining a mother sintered magnet body which had the composition: $Nd_{13.3}Dy_{0.5}Fe_{bal}Co_{2.4}Cu_{0.1}Al_{0.5}B_{6.0}$.

Tb and Al metals having a purity of at least 99% by weight were used and high-frequency melted in an argon atmosphere to form a diffusion alloy having the composition $Tb_{33}Al_{67}$ and composed mainly of an intermetallic compound phase $TbAl_2$. The alloy was finely pulverized on a ball mill using an organic solvent into a fine powder having a mass median particle diameter of 8.6 μm. On electron probe microanalysis (EPMA), the alloy contained 94% by volume of the intermetallic compound phase $TbAl_2$.

The diffusion alloy $Tb_{33}Al_{67}$ powder was mixed with terbium oxide ($Tb_4O_7$) having an average particle size of 1 μm in a weight ratio of 1:1. The powder mixture was combined with deionized water in a weight fraction of 50% to form a slurry, in which the mother sintered magnet body was immersed for 30 seconds under ultrasonic agitation. The magnet body was pulled up and immediately dried with hot air. The magnet body covered with the powder mixture was diffusion treated in an argon atmosphere at 900° C. for 8 hours, aged at 500° C. for 1 hour, and quenched, yielding a magnet of Example 1.

Separately, the diffusion alloy $Tb_{33}Al_{67}$ powder having a mass median particle diameter of 8.6 μm alone was combined with deionized water in a weight fraction of 50% to form a slurry, in which the magnet body was immersed for 30 seconds under ultrasonic agitation. The magnet body was pulled up and immediately dried with hot air. The magnet body covered with the diffusion alloy powder was diffusion treated in an argon atmosphere at 900° C. for 8 hours, aged at 500° C. for 1 hour, and quenched, yielding a magnet of Comparative Example 1. In the absence of the diffusion powder, only the mother sintered magnet body was similarly heated treated in vacuum at 900° C. for 8 hours, yielding a magnet of Comparative Example 2.

Table 1 summarizes the composition of the mother sintered magnet body, diffusion rare earth alloy and diffusion rare earth oxide, and a mixing ratio (by weight) of the diffusion powder in Example 1 and Comparative Examples 1 and 2. Table 2 shows the temperature (° C.) and time (hr) of diffusion treatment and the magnetic properties of the magnets. It is seen that the magnet of Example 1 has a coercive force (Hcj) which is greater by 90 kAm⁻¹ than that of Comparative Example 1 and a remanence (Br) which is higher by 8 mT than that of Comparative Example 1. The coercive force (Hcj) of the magnet of Example 1 is greater by 1,090 kAm⁻¹ than that of Comparative Example 2 while a decline of remanence (Br) is only 5 mT.

TABLE 1

| | Mother sintered magnet body | Diffusion powder mixture | | |
| --- | --- | --- | --- | --- |
| | | Rare earth alloy | Rare earth oxide | Mixing ratio (by weight) |
| Example 1 | $Nd_{13.3}Dy_{0.5}Fe_{bal}Co_{2.4}Cu_{0.1}Al_{0.5}B_{6.0}$ | $Tb_{33}Al_{67}$ | $Tb_4O_7$ | 50:50 |
| Comparative Example 1 | $Nd_{13.3}Dy_{0.5}Fe_{bal}Co_{2.4}Cu_{0.1}Al_{0.5}B_{6.0}$ | $Tb_{33}Al_{67}$ | — | $Tb_{33}Al_{67}$ alone |
| Comparative Example 2 | $Nd_{13.3}Dy_{0.5}Fe_{bal}Co_{2.4}Cu_{0.1}Al_{0.5}B_{6.0}$ | — | — | — |

TABLE 2

| | Diffusion treatment | | Br (T) | Hcj (kAm⁻¹) | $(BH)_{max}$ (kJ/m³) |
| --- | --- | --- | --- | --- | --- |
| | Temperature (° C.) | Time (hr) | | | |
| Example 1 | 900 | 8 | 1.415 | 2,130 | 390 |
| Comparative Example 1 | 900 | 8 | 1.407 | 2,040 | 386 |
| Comparative Example 2 | 900 | 8 | 1.420 | 1,040 | 380 |

Example 2 and Comparative Example 3

As in Example 1, a mother sintered magnet body having the composition: $Nd_{13.3}Dy_{0.5}Fe_{bal}Co_{2.4}Cu_{0.1}al_{0.5}B_{6.0}$ was prepared.

Tb, Co, Fe and Al metals having a purity of at least 99% by weight were used and high-frequency melted in an argon atmosphere to form a diffusion alloy having the composition $Tb_{35}Fe_{21}Co_{24}Al_{20}$. The alloy was finely pulverized on a ball mill using an organic solvent into a fine powder having a mass median particle diameter of 8.9 μm. On EPMA analysis, the alloy contained intermetallic compound phases $Tb(FeCoAl)_2$, $Tb_2(FeCoAl)$ and $Tb_2(FeCoAl)_{17}$, which summed to 87% by volume.

The diffusion alloy $Tb_{35}Fe_{21}Co_{24}Al_{20}$ powder was mixed with $Tb_4O_7$ having an average particle size of 1 μm in a weight ratio of 1:1. The powder mixture was combined with deionized water in a weight fraction of 50% to form a slurry, in which the mother sintered magnet body was immersed for 30 seconds under ultrasonic agitation. The magnet body was pulled up and immediately dried with hot air. The magnet body covered with the powder mixture was diffusion treated in an argon atmosphere at 900° C. for 8 hours, aged at 500° C. for 1 hour, and quenched, yielding a magnet of Example 2.

In the absence of the diffusion powder, only the mother sintered magnet body was similarly heat treated in vacuum at 900° C. for 8 hours, yielding a magnet of Comparative Example 3.

Table 3 summarizes the composition of the mother sintered magnet body, diffusion rare earth alloy and diffusion rare earth oxide, and a mixing ratio (by weight) of the diffusion powder in Example 2 and Comparative Example 3. Table 4 shows the temperature (° C.) and time (hr) of diffusion treatment and the magnetic properties of the magnets. It is seen that the coercive force (Hcj) of the magnet of Example 2 is greater by 1,020 kAm⁻¹ than that of Comparative Example 3 while a decline of remanence (Br) is only 4 mT.

TABLE 3

|  | Mother sintered magnet body | Diffusion powder mixture | | |
|---|---|---|---|---|
|  |  | Rare earth alloy | Rare earth oxide | Mixing ratio (by weight) |
| Example 2 | $Nd_{13.3}Dy_{0.5}Fe_{bal}Co_{2.4}Cu_{0.1}Al_{0.5}B_{6.0}$ | $Tb_{35}Fe_{21}Co_{24}Al_{20}$ | $Tb_4O_7$ | 50:50 |
| Comparative Example 3 | $Nd_{13.3}Dy_{0.5}Fe_{bal}Co_{2.4}Cu_{0.1}Al_{0.5}B_{6.0}$ | — | — | — |

TABLE 4

|  | Diffusion treatment | | | | |
|---|---|---|---|---|---|
|  | Temperature (° C.) | Time (hr) | Br (T) | Hcj (kAm$^{-1}$) | (BH)$_{max}$ (kJ/m$^3$) |
| Example 2 | 900 | 8 | 1.416 | 2,060 | 390 |
| Comparative Example 3 | 900 | 8 | 1.420 | 1,040 | 380 |

Examples 3 to 55

As in Example 1, a series of mother sintered magnet bodies were coated with a different powder mixture of diffusion alloy and rare earth oxide and diffusion treated at a selected temperature for a selected time. Table 5 summarizes the composition of the mother sintered magnet body, diffusion rare earth alloy and rare earth oxide, and a mixing ratio (by weight) of the diffusion powder. Table 6 shows the temperature (° C.) and time (hr) of diffusion treatment and the magnetic properties of the resulting magnets. All the diffusion alloys contained at least 70% by volume of intermetallic compounds.

TABLE 5

|  | Mother sintered magnet body | Diffusion powder mixture | | |
|---|---|---|---|---|
|  |  | Rare earth alloy | Rare earth oxide | Mixing ratio (by weight) |
| Example 3 | $Nd_{15.0}Fe_{bal}Co_{1.0}B_{5.4}$ | $Nd_{35}Fe_{20}Co_{15}Al_{30}$ | $Tb_4O_7$ | 30:70 |
| Example 4 | $Nd_{15.0}Fe_{bal}Co_{1.0}B_{5.4}$ | $Nd_{35}Fe_{25}Co_{20}Si_{20}$ | $Dy_2O_3$ | 60:40 |
| Example 5 | $Nd_{15.0}Fe_{bal}Co_{1.0}B_{5.4}$ | $Nd_{33}Fe_{20}Co_{27}Al_{15}Si_5$ | $Nd_2O_3$ | 10:90 |
| Example 6 | $Nd_{11.0}Dy_{2.0}Tb_{2.0}Fe_{bal}Co_{1.0}B_{5.5}$ | $Nd_{28}Pr_5Al_{67}$ | $Pr_2O_3$ | 90:10 |
| Example 7 | $Nd_{16.5}Fe_{bal}Co_{1.5}B_{6.2}$ | $Y_{21}Mn_{78}Cr_1$ | $Dy_2O_3$ | 50:50 |
| Example 8 | $Nd_{13.0}Pr_{2.5}Fe_{bal}Co_{2.8}B_{4.8}$ | $La_{33}Cu_{60}Co_4Ni_3$ | $Tb_2O_3$ | 50:50 |
| Example 9 | $Nd_{13.0}Pr_{2.5}Fe_{bal}Co_{2.8}B_{4.8}$ | $La_{50}Ni_{49}V_1$ | $CeO_2$ | 70:30 |
| Example 10 | $Nd_{13.0}Dy_{1.5}Fe_{bal}Co_{1.0}B_{5.9}$ | $La_{33}Cu_{66.5}Nb_{0.5}$ | $La_2O_3$ | 30:70 |
| Example 11 | $Nd_{16.5}Fe_{bal}Co_{3.0}B_{4.7}$ | $Ce_{22}Ni_{14}Co_{58}Zn_6$ | $Tb_4O_7$ | 80:20 |
| Example 12 | $Nd_{16.5}Fe_{bal}Co_{3.0}B_{4.7}$ | $Ce_{17}Ni_{83}$ | $CeO_2$ | 50:50 |
| Example 13 | $Nd_{17.3}Fe_{bal}Co_{3.5}B_{6.3}$ | $Ce_{11}Zn_{89}$ | $Gd_2O_3$ | 50:50 |
| Example 14 | $Nd_{16.0}Dy_{1.5}Fe_{bal}Co_{4.5}B_{5.1}$ | $Pr_{33}Ge_{67}$ | $Y_2O_3$ | 50:50 |
| Example 15 | $Nd_{12.2}Pr_{2.5}Fe_{bal}Co_{1.0}B_{5.3}$ | $Tb_{33}Al_{60}H_7$ | $Dy_2O_3$ | 50:50 |
| Example 16 | $Nd_{14.5}Pr_{2.5}Fe_{bal}Co_{3.5}B_{5.6}$ | $Pr_{33}Al_{66}Zr_1$ | $Tb_4O_7$ | 75:25 |
| Example 17 | $Nd_{13.0}Tb_{1.5}Fe_{bal}B_{5.5}$ | $Gd_{32}Mn_{30}Fe_{31}Nb_7$ | $Dy_2O_3$ | 50:50 |
| Example 18 | $Nd_{12.0}Fe_{bal}Co_{1.0}B_{4.8}$ | $Gd_{37}Mn_{40}Co_{20}Mo_3$ | $Tb_4O_7$ | 25:75 |
| Example 19 | $Nd_{13.0}Tb_{1.5}Fe_{bal}B_{5.5}$ | $Gd_{21}Mn_{78}Mo_1$ | $Dy_2O_3$ | 40:60 |
| Example 20 | $Nd_{12.0}Fe_{bal}Co_{1.0}B_{4.8}$ | $Gd_{33}Mn_{66}Ta_1$ | $Tb_4O_7$ | 50:50 |
| Example 21 | $Nd_{12.0}Pr_{2.7}Fe_{bal}Co_{2.5}B_{5.2}$ | $Tb_{29}Fe_{45}Ni_{20}Ag_6$ | $Yb_2O_3$ | 50:50 |
| Example 22 | $Nd_{13.0}Pr_{2.0}Fe_{bal}Co_{2.5}B_{5.2}$ | $Tb_{50}Ag_{50}$ | $Tb_4O_7$ | 60:40 |
| Example 23 | $Nd_{12.5}Dy_{3.0}Fe_{bal}Co_{0.7}B_{5.9}$ | $Tb_{50}In_{50}$ | $Dy_2O_3$ | 50:50 |
| Example 24 | $Nd_{12.5}Pr_{2.5}Tb_{0.5}Fe_{bal}Co_{0.5}B_{5.0}$ | $Dy_{31}Ni_8Cu_{55}Sn_6$ | $Tb_4O_7$ | 50:50 |
| Example 25 | $Nd_{10.0}Pr_{2.5}Dy_{2.5}Fe_{bal}Co_{0.6}B_{5.7}$ | $Dy_{33}Cu_{66.5}Hf_{0.5}$ | $Pr_2O_3$ | 50:50 |
| Example 26 | $Nd_{13.0}Pr_{2.2}Fe_{bal}Co_{1.0}B_{5.3}$ | $Dy_{33}Fe_{67}$ | $Dy_2O_3$ | 50:50 |
| Example 27 | $Nd_{12.8}Pr_{2.5}Tb_{0.2}Fe_{bal}Co_{1.0}B_{4.5}$ | $Er_{33}Mn_{30}Co_{35}Ta_2$ | $Tb_4O_7$ | 50:50 |
| Example 28 | $Nd_{13.2}Pr_{2.5}Dy_{0.5}Fe_{bal}Co_{3.0}B_{6.3}$ | $Er_{21}Mn_{78.6}W_{0.4}$ | $Er_2O_3$ | 50:50 |
| Example 29 | $Nd_{12.0}Tb_{3.5}Fe_{bal}Co_{3.5}B_{6.2}$ | $Yb_{24}Co_5Ni_{69}Bi_2$ | $Tb_4O_7$ | 50:50 |
| Example 30 | $Nd_{13.0}Dy_{3.0}Fe_{bal}Co_{2.0}B_{4.8}$ | $Yb_{50}Cu_{49}Ti_1$ | $Pr_2O_3$ | 50:50 |
| Example 31 | $Nd_{11.0}Tb_{3.5}Fe_{bal}Co_{3.5}B_{6.2}$ | $Yb_{25}Ni_{74.5}Sb_{0.5}$ | $Yb_2O_3$ | 50:50 |
| Example 32 | $Nd_{15.5}Fe_{bal}Co_{1.0}B_{5.3}$ | $Nd_{33}Al_{67}$ | $Tb_4O_7$ | 90:10 |
| Example 33 | $Nd_{15.1}Fe_{bal}Co_{1.0}B_{5.4}$ | $Nd_{50}Si_{50}$ | $Dy_2O_3$ | 80:20 |
| Example 34 | $Nd_{14.8}Fe_{bal}Co_{1.0}B_{5.3}$ | $Nd_{33}Al_{37}Si_{30}$ | $Dy_2O_3$ | 20:80 |
| Example 35 | $Nd_{11.8}Pr_{3.0}Fe_{bal}Co_{1.0}B_{5.3}$ | $Nd_{34}Al_{61}H_5$ | $Tb_4O_7$ | 50:50 |
| Example 36 | $Nd_{12.3}Dy_{2.5}Fe_{bal}Co_{3.5}B_{5.4}$ | $Nd_{27}Pr_6Al_{67}$ | $Tb_4O_7$ | 50:50 |
| Example 37 | $Nd_{15.1}Fe_{bal}Co_{1.0}B_{5.3}$ | $Dy_{33}Al_{67}$ | $Tb_4O_7$ | 75:25 |
| Example 38 | $Nd_{13.6}Tb_{1.5}Fe_{bal}Co_{3.5}B_{5.2}$ | $Dy_{33}Ga_{67}$ | $Tb_4O_7$ | 50:50 |
| Example 39 | $Nd_{15.1}Fe_{bal}Co_{1.0}B_{5.3}$ | $Tb_{33}Al_{67}$ | $Dy_2O_3$ | 80:20 |
| Example 40 | $Nd_{13.5}Pr_{2.0}Dy_{2.0}Fe_{bal}Co_{2.5}B_{5.3}$ | $Tb_{22}Mn_{78}$ | $Tb_4O_7$ | 50:50 |
| Example 41 | $Nd_{12.5}Pr_{2.5}Fe_{bal}Co_{1.0}B_{5.3}$ | $Tb_{33}Co_{67}$ | $Dy_2O_3$ | 50:50 |
| Example 42 | $Nd_{19.0}Fe_{bal}Co_{3.0}B_{5.4}$ | $Y_{10}Co_{15}Zn_{75}$ | $Y_2O_3$ | 70:30 |
| Example 43 | $Nd_{18.0}Fe_{bal}Co_{2.5}B_{6.6}$ | $Y_{68}Fe_2In_{30}$ | $Tb_4O_7$ | 50:50 |
| Example 44 | $Nd_{18.0}Fe_{bal}Co_{3.0}B_{5.4}$ | $Y_{11}Zn_{89}$ | $Dy_2O_3$ | 80:20 |
| Example 45 | $Nd_{13.5}Pr_{1.5}Dy_{0.8}Fe_{bal}Co_{2.5}B_{4.5}$ | $La_{32}Co_4Cu_{64}$ | $Tb_4O_7$ | 50:50 |
| Example 46 | $Nd_{13.5}Pr_{1.5}Dy_{0.8}Fe_{bal}Co_{2.5}B_{4.5}$ | $La_{33}Cu_{67}$ | $Pr_2O_3$ | 50:50 |
| Example 47 | $Nd_{20.0}Fe_{bal}Co_{5.5}B_{4.1}$ | $Ce_{26}Pb_{74}$ | $Tb_4O_7$ | 40:60 |

TABLE 5-continued

| | Diffusion powder mixture | | | |
|---|---|---|---|---|
| | Mother sintered magnet body | Rare earth alloy | Rare earth oxide | Mixing ratio (by weight) |
| Example 48 | $Nd_{15.2}Fe_{bal}Co_{1.0}B_{5.3}$ | $Ce_{56}Sn_{44}$ | $CeO_2$ | 50:50 |
| Example 49 | $Nd_{15.5}Dy_{2.5}Tb_{0.5}Fe_{bal}Co_{2.6}B_{4.4}$ | $Pr_{33}Fe_3C_{64}$ | $Dy_2O_3$ | 50:50 |
| Example 50 | $Nd_{12.5}Dy_{2.0}Tb_{0.5}Fe_{bal}Co_{3.8}B_{6.2}$ | $Pr_{50}P_{50}$ | $Nd_2O_3$ | 50:50 |
| Example 51 | $Nd_{12.7}Pr_{2.5}Dy_{0.6}Fe_{bal}Co_{1.4}B_{5.6}$ | $Gd_{52}Ni_{48}$ | $Tb_4O_7$ | 70:30 |
| Example 52 | $Nd_{13.1}Pr_{1.5}Tb_{0.5}Fe_{bal}Co_{2.8}B_{6.3}$ | $Gd_{37}Ga_{63}$ | $Dy_2O_3$ | 60:40 |
| Example 53 | $Nd_{15.3}Dy_{0.6}Fe_{bal}Co_{1.0}B_{4.9}$ | $Er_{32}Mn_{67}Ta_1$ | $Nd_2O_3$ | 50:50 |
| Example 54 | $Nd_{14.5}Pr_{1.0}Dy_{0.5}Fe_{bal}Co_{2.8}B_{4.6}$ | $Yb_{68}Pb_{32}$ | $Tb_4O_7$ | 50:50 |
| Example 55 | $Nd_{12.0}Pr_{1.5}Dy_{0.5}Fe_{bal}Co_{4.2}B_{5.3}$ | $Yb_{69}Sn_{29}Bi_2$ | $Yb_2O_3$ | 80:20 |

TABLE 6

| | Diffusion treatment | | | | |
|---|---|---|---|---|---|
| | Temperature (° C.) | Time (hr or min) | Br (T) | Hcj (kAm$^{-1}$) | (BH)max (kJ/m$^3$) |
| Example 3 | 780 | 8 h | 1.404 | 2,032 | 385 |
| Example 4 | 880 | 8 h | 1.419 | 1,992 | 390 |
| Example 5 | 820 | 6 h | 1.416 | 2,036 | 389 |
| Example 6 | 750 | 5 h | 1.411 | 1,987 | 388 |
| Example 7 | 930 | 10 h | 1.343 | 1,008 | 343 |
| Example 8 | 780 | 5 h | 1.367 | 1,225 | 354 |
| Example 9 | 890 | 7 h | 1.388 | 1,219 | 363 |
| Example 10 | 820 | 8 h | 1.432 | 1,052 | 396 |
| Example 11 | 450 | 12 h | 1.348 | 920 | 349 |
| Example 12 | 840 | 6 h | 1.353 | 940 | 343 |
| Example 13 | 400 | 5 h | 1.327 | 1,052 | 340 |
| Example 14 | 830 | 5 h | 1.328 | 1,890 | 341 |
| Example 15 | 820 | 8 h | 1.412 | 2,130 | 385 |
| Example 16 | 850 | 8 h | 1.371 | 2,048 | 363 |
| Example 17 | 960 | 10 h | 1.410 | 1,785 | 376 |
| Example 18 | 940 | 6 h | 1.454 | 1,620 | 398 |
| Example 19 | 920 | 5 h | 1.411 | 1,615 | 381 |
| Example 20 | 860 | 5 h | 1.452 | 1,748 | 396 |
| Example 21 | 920 | 10 h | 1.414 | 1,672 | 379 |
| Example 22 | 920 | 6 h | 1.412 | 1,910 | 384 |
| Example 23 | 940 | 12 h | 1.405 | 1,955 | 381 |
| Example 24 | 870 | 12 h | 1.404 | 1,930 | 382 |
| Example 25 | 860 | 10 h | 1.409 | 1,870 | 383 |
| Example 26 | 850 | 8 h | 1.408 | 2,060 | 382 |
| Example 27 | 1,020 | 8 h | 1.376 | 1,610 | 362 |
| Example 28 | 980 | 12 h | 1.368 | 1,521 | 363 |
| Example 29 | 320 | 15 min | 1.397 | 1,580 | 370 |
| Example 30 | 380 | 25 min | 1.351 | 1,430 | 354 |
| Example 31 | 410 | 40 min | 1.430 | 1,243 | 390 |
| Example 32 | 790 | 8 h | 1.404 | 2,070 | 382 |
| Example 33 | 820 | 10 h | 1.421 | 2,034 | 388 |
| Example 34 | 910 | 5 h | 1.416 | 2,095 | 386 |
| Example 35 | 760 | 8 h | 1.417 | 2,100 | 386 |
| Example 36 | 770 | 8 h | 1.421 | 2,120 | 387 |
| Example 37 | 830 | 8 h | 1.410 | 2,130 | 384 |
| Example 38 | 760 | 3 h | 1.414 | 2,140 | 386 |
| Example 39 | 880 | 8 h | 1.416 | 2,170 | 389 |
| Example 40 | 660 | 20 h | 1.353 | 1,860 | 354 |
| Example 41 | 860 | 8 h | 1.414 | 2,110 | 386 |
| Example 42 | 450 | 12 h | 1.317 | 1,290 | 326 |
| Example 43 | 1,030 | 2 h | 1.286 | 1,346 | 309 |
| Example 44 | 450 | 8 h | 1.332 | 1,211 | 334 |
| Example 45 | 660 | 14 h | 1.350 | 1,407 | 347 |
| Example 46 | 620 | 12 h | 1.347 | 1,314 | 344 |
| Example 47 | 520 | 10 h | 1.203 | 1,305 | 276 |
| Example 48 | 460 | 14 h | 1.361 | 1,120 | 350 |
| Example 49 | 860 | 30 h | 1.278 | 1,258 | 312 |
| Example 50 | 360 | 40 min | 1.412 | 1,185 | 368 |
| Example 51 | 960 | 2 h | 1.390 | 1,545 | 366 |
| Example 52 | 850 | 30 min | 1.415 | 1,410 | 382 |
| Example 53 | 700 | 10 h | 1.373 | 1,099 | 355 |
| Example 54 | 750 | 12 h | 1.351 | 1,460 | 346 |
| Example 55 | 420 | 10 h | 1.448 | 1,020 | 396 |

Example 56 and Comparative Example 4

An alloy was prepared by weighing amounts of Nd, Co, Al and Fe metals having a purity of at least 99% by weight and ferroboron, high-frequency heating in an argon atmosphere for melting, and casting the alloy melt on a single roll of copper in an argon atmosphere, that is, strip casting into a strip of alloy. The alloy consisted of 12.8 at % of Nd, 1.0 at % of Co, 0.5 at % of Al, 6.0 at % of B, and the balance of Fe. This is designated alloy A. Alloy A was then subjected to hydrogen decrepitation by causing the alloy to absorb hydrogen, vacuum evacuating and heating up to 500° C. for desorbing part of hydrogen. In this way, alloy A was pulverized into a coarse powder under 30 mesh.

Another alloy was prepared by weighing amounts of Nd, Dy, Fe, Co, Al and Cu metals having a purity of at least 99% by weight and ferroboron, high-frequency heating in an argon atmosphere for melting, and casting the alloy melt. The alloy consisted of 23 at % of Nd, 12 at % of Dy, 25 at % of Fe, 6 at % of B, 0.5 at % of Al, 2 at % of Cu, and the balance of Co. This is designated alloy B. Alloy B was ground on a Brown mill in a nitrogen atmosphere into a coarse powder under 30 mesh.

Next, 94 wt % of alloy A powder and 6 wt % of alloy B powder were mixed in a nitrogen-purged V-blender for 30 minutes. The powder mixture was finely pulverized on a jet mill using high-pressure nitrogen gas into a fine powder having a mass median particle diameter of 4 μm. The fine powder was compacted in a nitrogen atmosphere under a pressure of about 1 ton/cm$^2$ while being oriented in a magnetic field of 15 kOe. The green compact was then placed in a sintering furnace where it was sintered in an argon atmosphere at 1,060° C. for 2 hours, obtaining a magnet block of 10 mm×20 mm×15 mm (thick). Using a diamond grinding tool, the magnet block was machined on all the surfaces into a shape having dimensions of 4 mm×4 mm×2 mm (magnetic anisotropy direction). The machined magnet body was washed in sequence with alkaline solution, deionized water, acid solution, and deionized water, and dried, obtaining a mother sintered magnet body which had the composition: $Nd_{13.3}Dy_{0.5}Fe_{bal}Co_{2.4}Cu_{0.1}Al_{0.5}B_{6.0}$.

Al and Co metals having a purity of at least 99% by weight were used and high-frequency melted in an argon atmosphere to form a diffusion alloy having the composition $Al_{50}Co_{50}$ and composed mainly of an intermetallic compound phase AlCo. The alloy was finely pulverized on a ball mill using an organic solvent into a fine powder having a mass median particle diameter of 8.9 μm. On EPMA analysis, the alloy contained 94% by volume of the intermetallic compound phase AlCo.

The diffusion alloy $Al_{50}Co_{50}$ powder was mixed with terbium oxide ($Tb_4O_7$) having an average particle size of 1 μm in a weight ratio of 1:1. The powder mixture was combined with deionized water in a weight fraction of 50% to form a slurry, in which the mother sintered magnet body was immersed for 30 seconds under ultrasonic agitation. The magnet body was pulled up and immediately dried with hot air. The magnet body covered with the powder mixture was diffusion treated in an argon atmosphere at 900° C. for 8 hours, aged at 500° C. for 1 hour, and quenched, yielding a magnet of Example 56.

Separately, terbium oxide having an average particle size of 1 μm alone was combined with deionized water in a weight fraction of 50% to form a slurry, in which the magnet body was immersed for 30 seconds under ultrasonic agitation. The magnet body was pulled up and immediately dried with hot air. The coated magnet body was diffusion treated in an argon atmosphere at 900° C. for 8 hours, aged at 500° C. for 1 hour, and quenched, yielding a magnet of Comparative Example 4.

Table 7 summarizes the composition of the mother sintered magnet body, diffusion alloy and diffusion rare earth oxide, and a mixing ratio (by weight) of the diffusion powder mixture in Example 56 and Comparative Example 4. Table 8 shows the temperature (° C.) and time (hr) of diffusion treatment and the magnetic properties of the magnets. It is seen that the coercive force (Hcj) of the magnet of Example 56 is greater by 90 kAm$^{-1}$ than that of Comparative Example 4 while a decline of remanence (Br) is only 3 mT. The coercive force (Hcj) of the magnet of Example 56 is greater by 1,040 kAm$^{-1}$ than that of previous Comparative Example 2 while a decline of remanence (Br) is only 4 mT.

TABLE 7

|  | Mother sintered magnet body | Diffusion powder mixture | | |
|---|---|---|---|---|
|  |  | Diffusion alloy | Rare earth oxide | Mixing ratio (by weight) |
| Example 56 | $Nd_{13.3}Dy_{0.5}Fe_{bal}Co_{2.4}Cu_{0.1}Al_{0.5}B_{6.0}$ | $Al_{50}Co_{50}$ | $Tb_4O_7$ | 50:50 |
| Comparative Example 4 | $Nd_{13.3}Dy_{0.5}Fe_{bal}Co_{2.4}Cu_{0.1}Al_{0.5}B_{6.0}$ | — | $Tb_4O_7$ | $Tb_4O_7$ alone |
| Comparative Example 2 | $Nd_{13.3}Dy_{0.5}Fe_{bal}Co_{2.4}Cu_{0.1}Al_{0.5}B_{6.0}$ | — | — | — |

TABLE 8

|  | Diffusion treatment | | | | |
|---|---|---|---|---|---|
|  | Temperature (° C.) | Time (hr) | Br (T) | Hcj (kAm$^{-1}$) | (BH)$_{max}$ (kJ/m$^3$) |
| Example 56 | 900 | 8 | 1.416 | 2,080 | 390 |
| Comparative Example 4 | 900 | 8 | 1.419 | 1,990 | 393 |
| Comparative Example 2 | 900 | 8 | 1.420 | 1,040 | 380 |

Example 57 and Comparative Example 5

As in Example 56, a mother sintered magnet body having the composition: $Nd_{13.3}Dy_{0.5}Fe_{bal}Co_{2.4}Cu_{0.1}Al_{0.5}B_{6.0}$ was prepared.

Ni and Al metals having a purity of at least 99% by weight were used and high-frequency melted in an argon atmosphere to form a diffusion alloy having the composition $Ni_{25}Al_{75}$ and composed mainly of an intermetallic compound phase $NiAl_3$. The alloy was finely pulverized on a ball mill using an organic solvent into a fine powder having a mass median particle diameter of 9.3 μm. On EPMA analysis, the alloy contained 94% by volume of the intermetallic compound phase $NiAl_3$.

The diffusion alloy $Ni_{25}Al_{75}$ powder was mixed with terbium oxide ($Tb_4O_7$) having an average particle size of 1 μm in a weight ratio of 1:1. The powder mixture was combined with deionized water in a weight fraction of 50% to form a slurry, in which the mother sintered magnet body was immersed for 30 seconds under ultrasonic agitation. The magnet body was pulled up and immediately dried with hot air. The magnet body covered with the powder mixture was diffusion treated in an argon atmosphere at 900° C. for 8 hours, aged at 500° C. for 1 hour, and quenched, yielding a magnet of Example 57. In the absence of the diffusion powder mixture, the sintered magnet body alone was heat treated in vacuum at 900° C. for 8 hours, yielding a magnet of Comparative Example 5.

Table 9 summarizes the composition of the mother sintered magnet body, diffusion alloy and diffusion rare earth oxide, and a mixing ratio (by weight) of the diffusion powder mixture in Example 57 and Comparative Example 5. Table 10 shows the temperature (° C.) and time (hr) of diffusion treatment and the magnetic properties of the magnets. It is seen that the coercive force (Hcj) of the magnet of Example 57 is greater by 1,010 kAm$^{-1}$ than that of Comparative Example 5 while a decline of remanence (Br) is only 4 mT.

TABLE 9

| | Mother sintered magnet body | Diffusion powder mixture | | |
| --- | --- | --- | --- | --- |
| | | Diffusion alloy | Rare earth oxide | Mixing ratio (by weight) |
| Example 57 | $Nd_{13.3}Dy_{0.5}Fe_{bal}Co_{2.4}Cu_{0.1}Al_{0.5}B_{6.0}$ | $Ni_{25}Al_{75}$ | $Tb_4O_7$ | 50:50 |
| Comparative Example 5 | $Nd_{13.3}Dy_{0.5}Fe_{bal}Co_{2.4}Cu_{0.1}Al_{0.5}B_{6.0}$ | — | — | — |

TABLE 10

| | Diffusion treatment | | Br (T) | Hcj (kAm$^{-1}$) | (BH)$_{max}$ (kJ/m$^3$) |
| --- | --- | --- | --- | --- | --- |
| | Temperature (° C.) | Time (hr) | | | |
| Example 57 | 900 | 8 | 1.416 | 2,050 | 390 |
| Comparative Example 5 | 900 | 8 | 1.420 | 1,040 | 380 |

Examples 58 to 96

As in Example 56, a series of mother sintered magnet bodies were coated with a different powder mixture of diffusion alloy (or metal) and rare earth oxide and diffusion treated at a selected temperature for a selected time. Table 11 summarizes the composition of the mother sintered magnet body, diffusion alloy and rare earth oxide, and a mixing ratio (by weight) of the diffusion powder mixture. Table 12 shows the temperature (° C.) and time (hr) of diffusion treatment and the magnetic properties of the resulting magnets. All the diffusion alloys contained at least 70% by volume of intermetallic compounds.

TABLE 11

| | Mother sintered magnet body | Diffusion powder mixture | | |
| --- | --- | --- | --- | --- |
| | | Diffusion alloy or metal | Rare earth oxide | Mixing ratio (by weight) |
| Example 58 | $Nd_{15.0}Fe_{bal}Co_{1.0}B_{5.4}$ | $Mn_{27}Al_{73}$ | $Tb_4O_7$ | 30:70 |
| Example 59 | $Nd_{12.0}Pr_{3.0}Fe_{bal}Co_{3.0}B_{5.2}$ | $Ni_{25}Al_{75}$ | $Dy_2O_3$ | 90:10 |
| Example 60 | $Nd_{13.3}Dy_{0.5}Fe_{bal}Co_{2.0}B_{6.0}$ | Al | $Tb_4O_7$ | 50:50 |
| Example 61 | $Nd_{14.3}Dy_{1.2}Fe_{bal}Co_{2.0}B_{5.3}$ | $Cr_{12.5}Al_{87.5}$ | $Nd_2O_3$ | 20:80 |
| Example 62 | $Nd_{13.8}Tb_{0.7}Fe_{bal}Co_{1.0}B_{5.5}$ | $Co_{33}Si_{67}$ | $Pr_2O_3$ | 70:30 |
| Example 63 | $Nd_{15.8}Fe_{bal}Co_{1.5}B_{5.3}$ | $Mn_{25}Al_{25}Cu_{50}$ | $Tb_4O_7$ | 50:50 |
| Example 64 | $Nd_{14.4}Dy_{0.8}Tb_{0.3}Fe_{bal}Co_{1.0}B_{5.4}$ | $Fe_{50}Si_{50}$ | $CeO_2$ | 60:40 |
| Example 65 | $Nd_{18.2}Fe_{bal}Co_{4.0}B_{5.3}$ | $Fe_{49.9}Co_{0.1}Si_{50}$ | $La_2O_3$ | 30:70 |
| Example 66 | $Nd_{13.3}Dy_{0.5}Fe_{bal}Co_{2.0}B_{6.0}$ | Si | $Tb_4O_7$ | 50:50 |
| Example 67 | $Nd_{17.6}Fe_{bal}Co_{3.5}B_{4.2}$ | $Cr_{12.5}Al_{87.5}$ | $Tb_4O_7$ | 50:50 |
| Example 68 | $Nd_{15.6}Fe_{bal}Co_{1.0}B_{6.8}$ | $Mn_{67}P_{33}$ | $Dy_2O_3$ | 50:50 |
| Example 69 | $Nd_{12.0}Fe_{bal}Co_{2.0}B_{6.0}$ | $Ti_{50}Cu_{50}$ | $Gd_2O_3$ | 50:50 |
| Example 70 | $Nd_{12.9}Dy_{1.0}Fe_{bal}Co_{2.0}B_{6.0}$ | Cu | $Dy_2O_3$ | 50:50 |
| Example 71 | $Nd_{15.2}Fe_{bal}Co_{1.0}B_{5.5}$ | $V_{75}Sn_{25}$ | $Tb_4O_7$ | 75:25 |
| Example 72 | $Nd_{14.3}Fe_{bal}B_{6.1}$ | $Cr_{67}Ta_{33}$ | $Dy_2O_3$ | 50:50 |
| Example 73 | $Nd_{14.8}Fe_{bal}Co_{3.0}B_{5.4}$ | $Cu_{75}Sn_{25}$ | $Y_2O_3$ | 50:50 |
| Example 74 | $Pr_{15.0}Fe_{bal}Co_{6.5}B_{5.3}$ | $Cu_{70}Zn_5Sn_{25}$ | $Er_2O_3$ | 60:40 |
| Example 75 | $Nd_{13.8}Dy_{0.8}Fe_{bal}Co_{2.0}B_{6.2}$ | Zn | $Dy_2O_3$ | 50:50 |
| Example 76 | $Nd_{15.8}Pr_{1.5}Fe_{bal}Co_{2.5}B_{5.2}$ | $Ga_{40}Zr_{60}$ | $Tb_4O_7$ | 60:40 |
| Example 77 | $Nd_{13.5}Dy_{1.0}Fe_{bal}Co_{2.0}B_{6.0}$ | Ga | $Tb_4O_7$ | 50:50 |
| Example 78 | $Nd_{15.2}Fe_{bal}Co_{3.0}B_{5.3}$ | $Cr_{75}Ge_{25}$ | $Yb_2O_3$ | 50:50 |
| Example 79 | $Nd_{14.0}Dy_{0.8}Fe_{bal}Co_{3.0}B_{6.0}$ | Ge | $Dy_2O_3$ | 50:50 |
| Example 80 | $Nd_{14.6}Pr_{2.0}Dy_{0.8}Fe_{bal}Co_{2.0}B_{5.3}$ | $Nb_{33}Si_{67}$ | $Dy_2O_3$ | 50:50 |
| Example 81 | $Pr_{13.7}Dy_{1.0}Fe_{bal}Co_{1.0}B_{5.4}$ | $Al_{73}Mo_{27}$ | $Pr_2O_3$ | 40:60 |
| Example 82 | $Nd_{15.0}Fe_{bal}Co_{1.0}B_{6.4}$ | $Ti_{50}Ag_{50}$ | $Nd_2O_3$ | 60:40 |
| Example 83 | $Nd_{13.8}Dy_{1.0}Fe_{bal}Co_{1.0}B_{5.8}$ | Ag | $Tb_4O_7$ | 50:50 |
| Example 84 | $Nd_{14.3}Fe_{bal}Co_{1.0}B_{5.3}$ | $In_{25}Mn_{75}$ | $Tb_4O_7$ | 50:50 |
| Example 85 | $Nd_{13.9}Fe_{bal}B_{5.6}$ | $Hf_{33}Cr_{67}$ | $Dy_2O_3$ | 70:30 |
| Example 86 | $Nd_{15.2}Fe_{bal}Co_{1.0}B_{5.6}$ | $Cr_{25}Fe_{55}W_{20}$ | $Tb_4O_7$ | 50:50 |
| Example 87 | $Nd_{15.1}Yb_{0.2}Fe_{bal}Co_{1.0}B_{4.8}$ | $Ni_{50}Sb_{50}$ | $Er_2O_3$ | 50:50 |
| Example 88 | $Nd_{15.7}Fe_{bal}Co_{5.0}B_{6.9}$ | $Ti_{80}Pb_{20}$ | $Tb_4O_7$ | 60:40 |
| Example 89 | $Nd_{14.6}Fe_{bal}Co_{1.0}B_{5.3}$ | $Mn_{25}Co_{50}Sn_{25}$ | $La_2O_3$ | 70:30 |
| Example 90 | $Nd_{14.9}Fe_{bal}Co_{0.7}B_{5.3}$ | $Co_{60}Sn_{40}$ | $Tb_4O_7$ | 50:50 |
| Example 91 | $Nd_{14.6}Fe_{bal}Co_{1.5}B_{5.5}$ | $V_{75}Sn_{25}$ | $Er_2O_3$ | 30:70 |
| Example 92 | $Nd_{12.8}Pr_{2.0}Fe_{bal}Co_{3.0}B_{5.6}$ | Sn | $Tb_4O_7$ | 50:50 |
| Example 93 | $Nd_{14.2}Fe_{bal}Co_{0.5}B_{5.6}$ | $Cr_{21}Fe_{62}Mo_{17}$ | $Tb_4O_7$ | 50:50 |
| Example 94 | $Nd_{15.0}Dy_{0.6}Fe_{bal}Co_{0.1}B_{4.1}$ | $Bi_{40}Zr_{60}$ | $Dy_2O_3$ | 40:60 |
| Example 95 | $Nd_{15.2}Fe_{bal}Co_{3.5}B_{6.4}$ | $Ni_{50}Bi_{50}$ | $Yb_2O_3$ | 50:50 |
| Example 96 | $Nd_{12.0}Pr_{3.0}Fe_{bal}Co_{2.0}B_{6.1}$ | Bi | $Dy_2O_3$ | 50:50 |

TABLE 12

| | Diffusion treatment | | | | |
|---|---|---|---|---|---|
| | Temperature (° C.) | Time (hr or min) | Br (T) | Hcj (kAm$^{-1}$) | (BH)$_{max}$ (kJ/m$^3$) |
| Example 58 | 790 | 3 h | 1.413 | 2,087 | 387 |
| Example 59 | 810 | 3 h 30 min | 1.407 | 2,187 | 384 |
| Example 60 | 850 | 8 h | 1.414 | 1,980 | 388 |
| Example 61 | 760 | 1 h | 1.380 | 1,928 | 368 |
| Example 62 | 820 | 2 h 30 min | 1.423 | 2,042 | 394 |
| Example 63 | 770 | 5 h | 1.394 | 2,223 | 373 |
| Example 64 | 820 | 4 h | 1.402 | 1,861 | 383 |
| Example 65 | 940 | 12 h | 1.298 | 1,904 | 328 |
| Example 66 | 870 | 8 h | 1.415 | 1,930 | 389 |
| Example 67 | 1,060 | 28 h | 1.284 | 1,713 | 319 |
| Example 68 | 380 | 15 min | 1.358 | 1,512 | 353 |
| Example 69 | 680 | 8 h | 1.476 | 1,498 | 409 |
| Example 70 | 820 | 8 h | 1.417 | 1,820 | 390 |
| Example 71 | 940 | 5 h | 1.414 | 1,816 | 387 |
| Example 72 | 1,020 | 10 h | 1.426 | 1,896 | 393 |
| Example 73 | 650 | 8 h | 1.420 | 1,641 | 387 |
| Example 74 | 600 | 10 h | 1.406 | 1,689 | 379 |
| Example 75 | 760 | 8 h | 1.403 | 1,760 | 379 |
| Example 76 | 840 | 5 h | 1.355 | 1,940 | 351 |
| Example 77 | 870 | 8 h | 1.415 | 1,950 | 389 |
| Example 78 | 850 | 7 h | 1.420 | 1,816 | 390 |
| Example 79 | 880 | 8 h | 1.411 | 1,890 | 387 |
| Example 80 | 1,000 | 10 h | 1.358 | 1,896 | 355 |
| Example 81 | 770 | 1 h | 1.417 | 2,085 | 386 |
| Example 82 | 760 | 4 h | 1.404 | 1,530 | 380 |
| Example 83 | 920 | 8 h | 1.413 | 1,910 | 386 |
| Example 84 | 630 | 13 h | 1.446 | 1,780 | 401 |
| Example 85 | 960 | 7 h | 1.433 | 1,620 | 394 |
| Example 86 | 920 | 15 h | 1.413 | 1,940 | 385 |
| Example 87 | 750 | 6 h | 1.381 | 1,537 | 363 |
| Example 88 | 920 | 5 h | 1.369 | 1,338 | 355 |
| Example 89 | 640 | 6 h | 1.424 | 1,418 | 391 |
| Example 90 | 880 | 40 min | 1.414 | 2,040 | 383 |
| Example 91 | 1,020 | 10 h | 1.420 | 1,450 | 387 |
| Example 92 | 730 | 5 h | 1.408 | 1,820 | 383 |
| Example 93 | 880 | 15 h | 1.454 | 1,800 | 406 |
| Example 94 | 510 | 20 h | 1.346 | 1,430 | 343 |
| Example 95 | 360 | 5 min | 1.392 | 1,211 | 362 |
| Example 96 | 420 | 15 min | 1.382 | 1,510 | 358 |

Japanese Patent Application Nos. 2011-102787 and 2011-102789 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing a rare earth permanent magnet, comprising the steps of:
   disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \leq a \leq 20$, $0 \leq c \leq 10$, $4.0 \leq d \leq 7.0$, the balance of b, and a+b+c+d=100, the powder mixture comprising an $M_1$ powder wherein $M^1$ is one element selected from the group consisting of P, V, Cr, Ge, Zr, Nb, Mo, In, Sn, Sb, Hf, Ta, W, Pb, and Bi, having an average particle size of up to 500 μm, and at least 10% by weight of an $R^2$ oxide wherein $R^2$ is at least one element selected from rare earth elements inclusive of Y and Sc, having an average particle size of up to 100 μm, and
   heat treating the sintered magnet body having the powder mixture disposed on its surface at a temperature lower than or equal to the sintering temperature of the sintered magnet body in vacuum or in an inert gas, for causing the elements $R^2$ and $M^1$ in the powder mixture to diffuse to grain boundaries in the interior of the sintered magnet body and/or near grain boundaries within the sintered magnet body primary phase grains.

2. The method of claim 1 wherein the heat treating step includes heat treatment at a temperature from 200° C. to (Ts-10°) C. for 1 minute to 30 hours wherein Ts represents the sintering temperature of the sintered magnet body.

3. The method of claim 1 wherein the disposing step includes dispersing the powder mixture in an organic solvent or water, immersing the sintered magnet body in the resulting slurry, taking up the sintered magnet body, and drying for thereby covering the surface of the sintered magnet body with the powder mixture.

4. The method of claim 1 wherein the sintered magnet body has a shape including a minimum portion with a dimension equal to or less than 20 mm.

5. A rare earth permanent magnet, which is prepared by disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \leq a \leq 20$, $0 \leq c \leq 10$, $4.0 \leq d \leq 7.0$, the balance of b, and a+b+c+d=100, the powder mixture comprising an $M^1$ powder wherein $M^1$ is one element selected from the group consisting of P, V, Cr, Mn, Ni, Fe, Co, Cu, Zn, Ga, Ge, Zr, Nb, Mo, In, Sn, Sb, Hf, Ta, W, Pb, and Bi, having an average particle size of up to 500 μm, and at least 10% by weight of an $R^2$ oxide wherein $R^1$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, wherein
   the elements $R^1$ and $M^1$ in the powder mixture are diffused to grain boundaries in the interior of the sintered magnet body and/or near grain boundaries within the sintered magnet body primary phase grains so that the coercive force of the rare earth permanent magnet is increased over the original sintered magnet body.

6. A method for preparing a rare earth permanent magnet, comprising the steps of:
   disposing a powder mixture on a surface of a sintered magnet body having the composition $R_a T^1_b M_c B_d$ wherein R is at least one element selected from rare earth elements inclusive of Y and Sc, $T^1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: $12 \leq a \leq 20$, $0 \leq c \leq 10$, $4.0 \leq d \leq 7.0$, the balance of b, and a+b+c+d=100, the powder mixture consisting of an $M^1$ powder wherein $M^1$ is at least one element selected from the group consisting of P, Ti, V, Cr, Mn, Ni, Fe, Co, Cu, Zn, Ga, Ge, Zr, Nb, Mo, Ag, In, Sn, Sb, Hf, Ta, W, Pb, and Bi, having an average particle size of up to 500 μm, and at least 10% by weight of an $R^2$ oxide wherein $R^2$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, for causing the elements $R^2$ and $M^1$ in the powder mixture to diffuse to grain boundaries in the interior of the sintered magnet body and/or near grain boundaries within the sintered magnet body primary phase grains.

7. The method of claim 6 wherein the heat treating step includes heat treatment at a temperature from 200° C. to (Ts-10°) C. for 1 minute to 30 hours wherein Ts represents the sintering temperature of the sintered magnet body.

8. The method of claim 6 wherein the disposing step includes dispersing the powder mixture in an organic solvent or water, immersing the sintered magnet body in the resulting slurry, taking up the sintered magnet body, and drying for thereby covering the surface of the sintered magnet body with the powder mixture.

9. The method of claim 6 wherein the sintered magnet body has a shape including a minimum portion with a dimension equal to or less than 20 mm.

10. The method of claim 6 wherein $M^1$ is one element selected from the group consisting of P, Ti, V, Cr, Mn, Ni, Cu, Zn, Ga, Ge, Zr, Nb, Mo, Ag, In, Sn, Sb, Hf, Ta, W, Pb, and Bi.

11. The method of claim 6 wherein $M^1$ is one element selected from the group consisting of P, Ti, V, Cr, Mn, Ni, Fe, Co, Ga, Ge, Zr, Nb, Mo, Ag, In, Sn, Sb, Hf, Ta, W, Pb, and Bi.

12. The method of claim 6 wherein $M^1$ is at least one element selected from the group consisting of P, Ti, V, Cr, Mn, Ni, Fe, Co, Ga, Ge, Zr, Nb, Mo, Ag, In, Sn, Sb, Hf, Ta, W, Pb, and Bi.

13. A rare earth permanent magnet, which is prepared by disposing a powder mixture on a surface of a sintered magnet body having the composition $R_a T^1_b M_c B_d$ wherein R is at least one element selected from rare earth elements inclusive of Y and Sc, $T_1$ is one or both of Fe and Co, M is at least one element selected from the group consisting of Al, Si, C, P, Ti, V, Cr, Mn, Ni, Cu, Zn, Ga, Ge, Zr, Nb, Mo, Ag, In, Sn, Sb, Hf, Ta, W, Pb, and Bi, B is boron, "a," "b," "c" and "d" indicative of atomic percent are in the range: 12≤a≤20, 0≤c≤10, 4.0≤d≤7.0, the balance of b, and a+b+c+d=100, the powder mixture consisting of an $M^1$ powder wherein $M^1$ is at least one element selected from the group consisting of P, Ti, V, Cr, Mn, Ni, Fe, Co, Cu, Zn, Ga, Ge, Zr, Nb, Mo, Ag, In, Sn, Sb, Hf, Ta, W, Pb, and Bi, having an average particle size of up to 500 μm, and at least 10% by weight of an $R^2$ oxide wherein $R^2$ is at least one element selected from rare earth elements inclusive of Y and Sc, having an average particle size of up to 100 μm, and heat treating the sintered magnet body having the powder mixture disposed on its surface at a temperature lower than or equal to the sintering temperature of the sintered magnet body in vacuum or in an inert gas, wherein the elements $R^2$ and $M^1$ in the powder mixture are diffused to grain boundaries in the interior of the sintered magnet body and/or near grain boundaries within the sintered magnet body primary phase grains so that the coercive force of the rare earth permanent magnet is increased over the original sintered magnet body.

14. The rare earth permanent magnet of claim 13 wherein $M^1$ is one element selected from the group consisting of P, Ti, V, Cr, Mn, Ni, Cu, Zn, Ga, Ge, Zr, Nb, Mo, Ag, In, Sn, Sb, Hf, Ta, W, Pb, and Bi.

15. The rare earth permanent magnet of claim 13 wherein $M^1$ is one element selected from the group consisting of P, Ti, V, Cr, Mn, Ni, Fe, Co, Ga, Ge, Zr, Nb, Mo, Ag, In, Sn, Sb, Hf, Ta, W, Pb, and Bi.

16. The rare earth permanent magnet of claim 13 wherein $M^1$ is at least one element selected from the group consisting of P, Ti, V, Cr, Mn, Ni, Fe, Co, Ga, Ge, Zr, Nb, Mo, Ag, In, Sn, Sb, Hf, Ta, W, Pb, and Bi.

* * * * *